United States Patent [19]
Seimiya et al.

[11] Patent Number: 5,693,886
[45] Date of Patent: Dec. 2, 1997

[54] PRESSURE SENSOR

[75] Inventors: Sadao Seimiya, Tokyo; Noboru Ichinose, Yokohama; Takashi Tokuda, Yokohama; Yoshikazu Goto, Yokohama; Shingo Kamoshita, Yokohama, all of Japan

[73] Assignees: Nippon Dyne-a-mat Corp., Tokyo; Hokushin Corporation, Yokohama, both of Japan

[21] Appl. No.: 685,548

[22] Filed: Jul. 24, 1996

[30] Foreign Application Priority Data

Jul. 28, 1995 [JP] Japan .................. 7-192707
Jul. 28, 1995 [JP] Japan .................. 7-192708

[51] Int. Cl.$^6$ .............. G01L 9/12; G01G 11/04
[52] U.S. Cl. .............. 73/718; 73/724; 73/862.337
[58] Field of Search .............. 73/718, 724, 780, 73/862.337; 361/283.1, 283.2, 283.3, 283.4; 177/210 C

[56] References Cited

U.S. PATENT DOCUMENTS

| | | | |
|---|---|---|---|
| 2,080,429 | 5/1937 | McNally | 361/283.1 |
| 2,576,488 | 11/1951 | Stovall, Jr. et al. | 73/780 X |
| 2,866,141 | 12/1958 | Frank et al. | 361/283.1 |
| 3,307,407 | 3/1967 | Berg et al. | 361/283.1 X |
| 3,328,653 | 6/1967 | Wolf, Jr. | 73/724 X |
| 3,487,402 | 12/1969 | Hillhouse | 73/862.337 X |
| 3,565,195 | 2/1971 | Miller et al. | 177/210 C X |
| 3,875,481 | 4/1975 | Miller et al. | 361/283.1 |
| 4,016,764 | 4/1977 | Rice | 73/724 |
| 4,370,697 | 1/1983 | Haberl et al. | 361/283.1 |
| 4,503,705 | 3/1985 | Polchaninoff | 73/862.625 X |

*Primary Examiner*—Ronald L. Biegel
*Assistant Examiner*—Paul D. Amrozowicz
*Attorney, Agent, or Firm*—Armstrong, Westerman, Hattori, McLeland & Naughton

[57] ABSTRACT

A pressure sensor, having a simple structure for accurately measuring any one of pressure and weight, is provided. The pressure sensor includes a pair of electrode layers and a dielectric layer. The dielectric layer is composed of a rubber elastic body positioned between the pair of electrode layers to act as a spacer for the pair of electrode layers. The dielectric layer has a tan δ, at 1 to 30 Hz at a temperature of 10° C. to 30° C., of 0.03 or less. The dielectric layer also has a rubber hardness of 20 to 80 degrees in terms of scale A according to JIS-K-6301 at 10° C. to 30° C. Further, the dielectric layer has an impact resilience of 75% or more measured according to JIS-K-6301 at 10° C. to 30° C. and a compression set of 3% or less measured according to JIS-K-6301 at 10° C. to 30° C. The dielectric layer is formed of any one of natural rubber, polybutadiene rubber, polyisoprene rubber, polyurethane rubber and silicone rubber.

83 Claims, 25 Drawing Sheets

[Fig2]
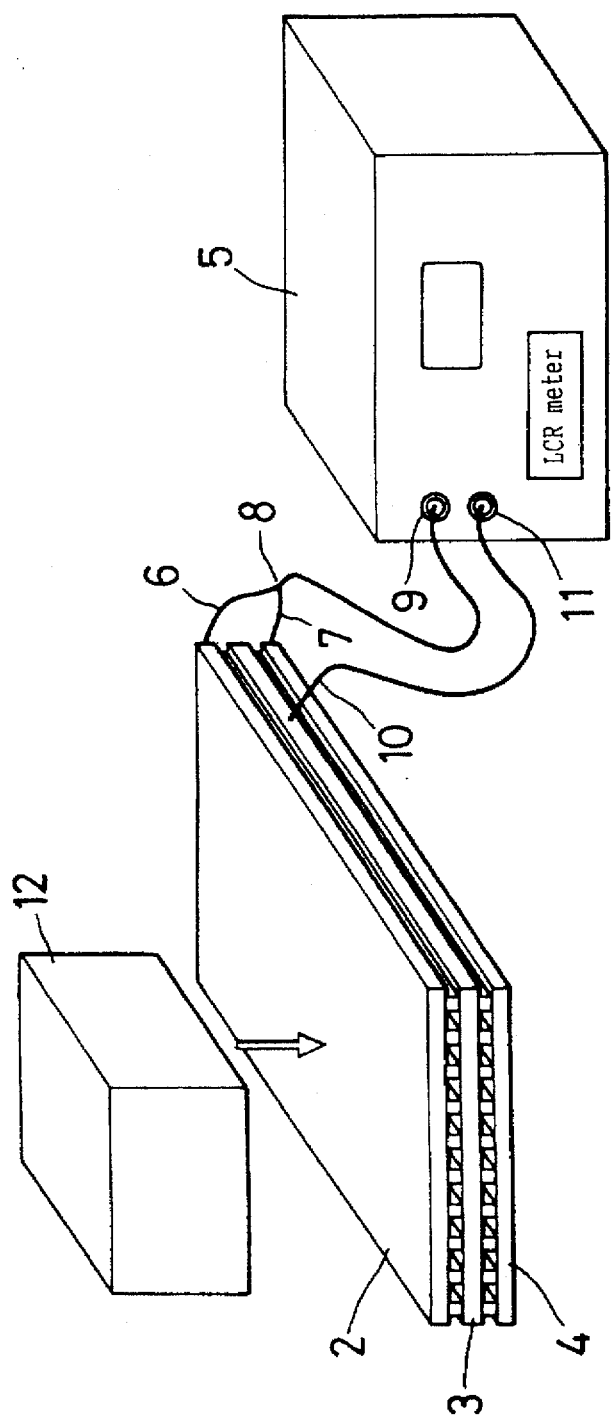

[Fig4]
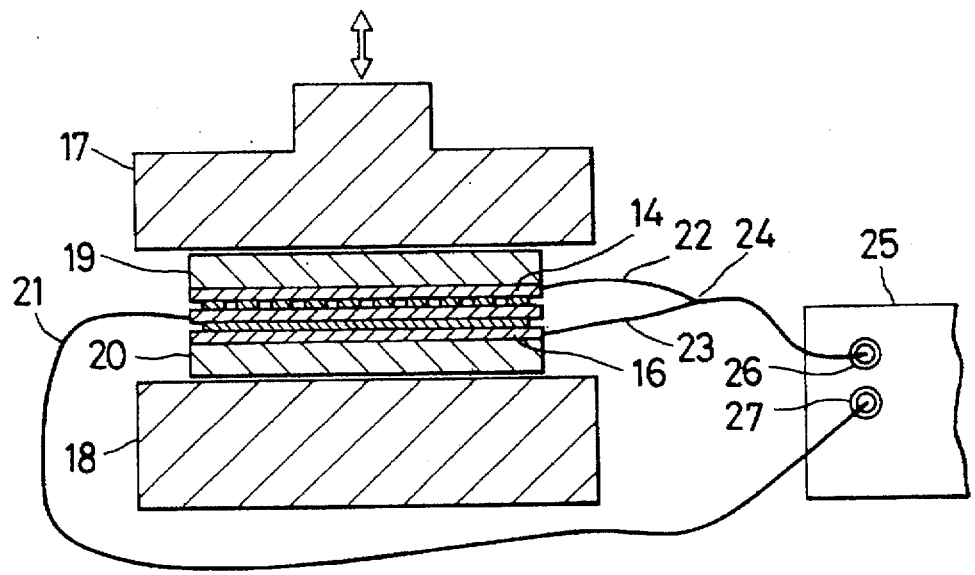
[Fig5]
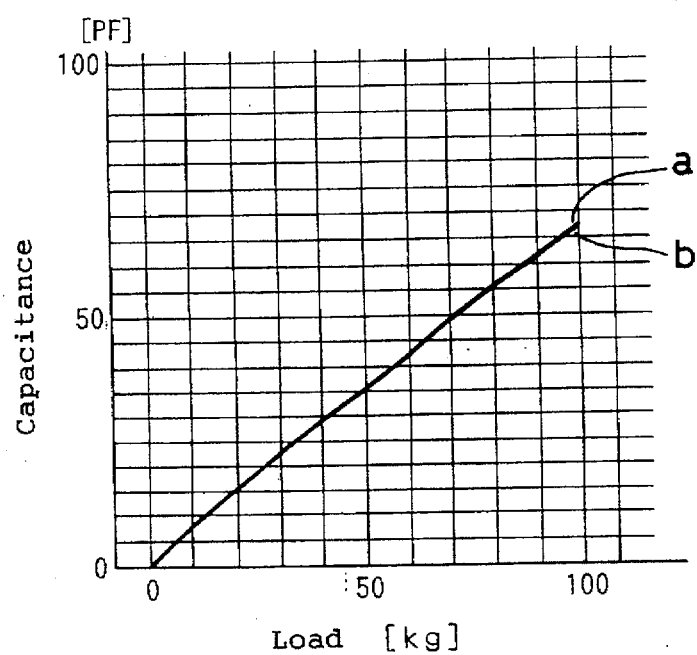

[Fig6]
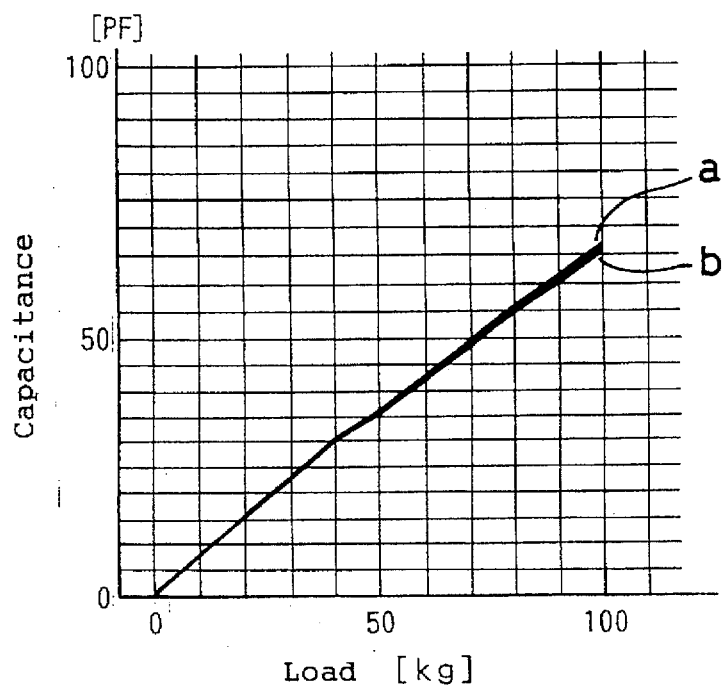
[Fig7]
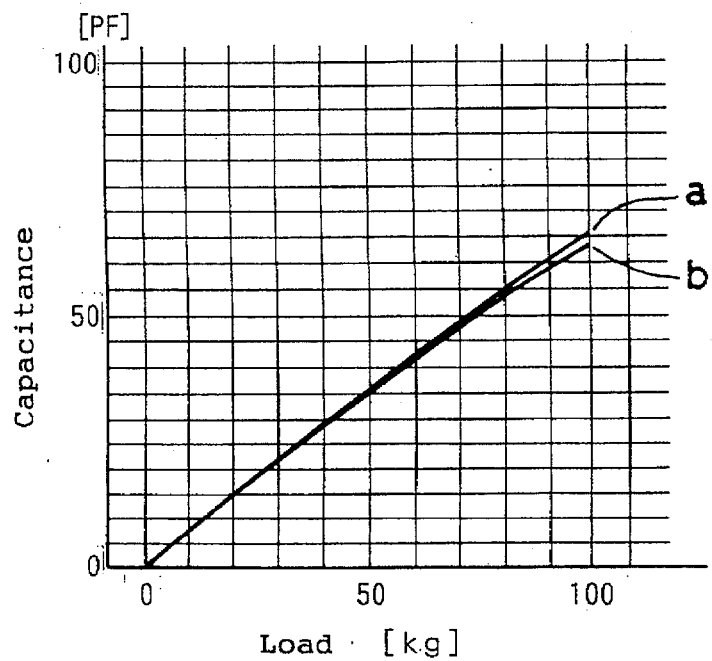

[Fig8]
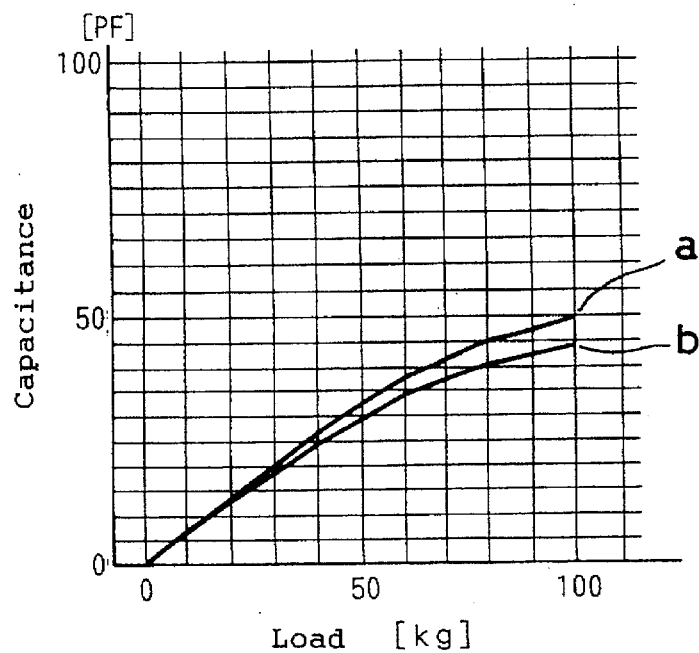
[Fig9]
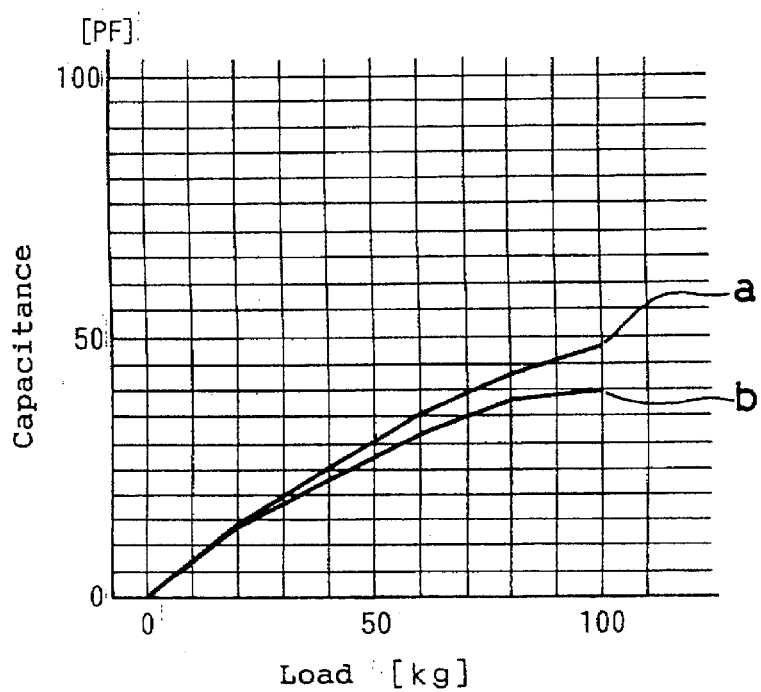

[Fig 10]
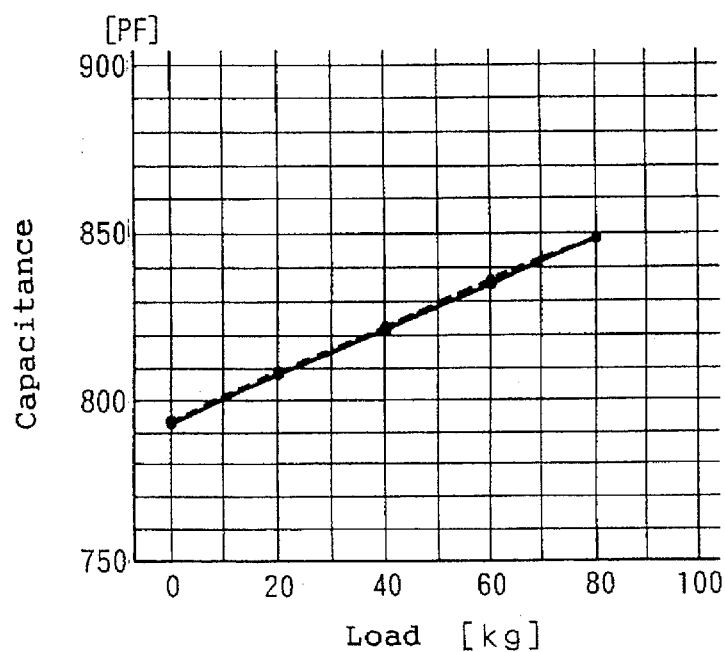
[Fig 11]
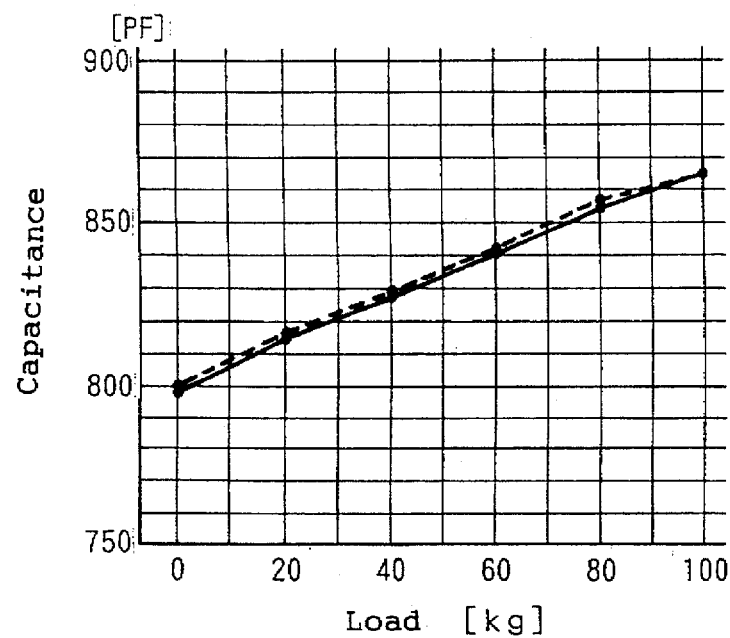

[Fig 12]
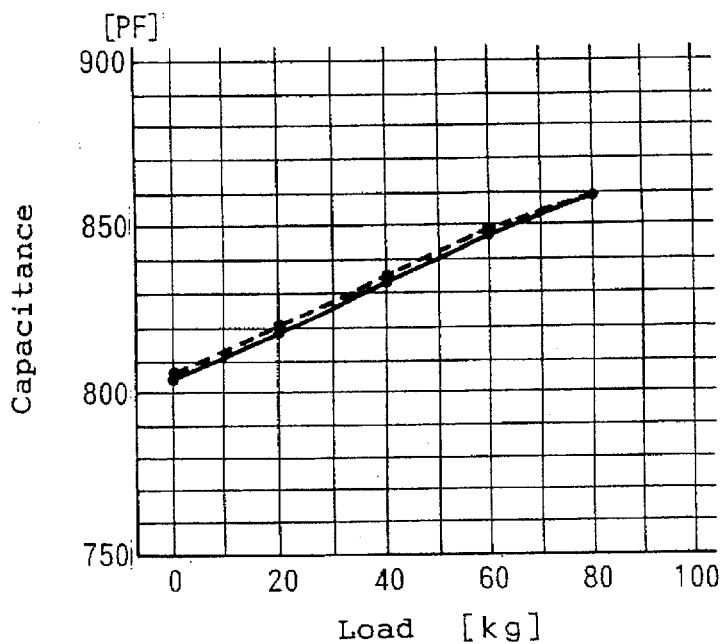
[Fig 13]
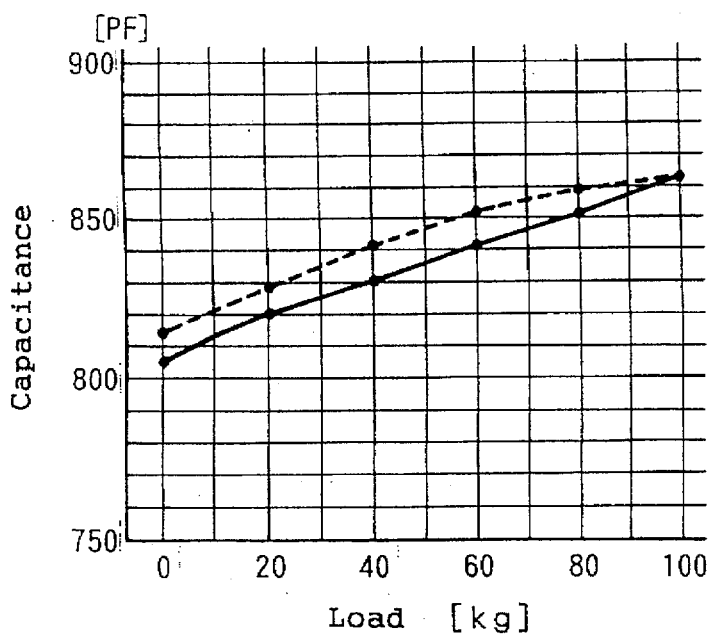

[Fig 14]
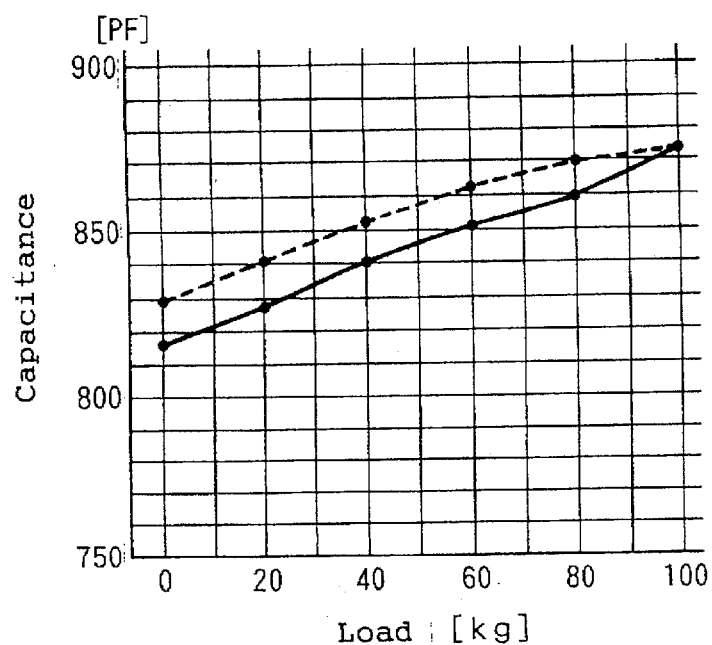
[Fig 15]
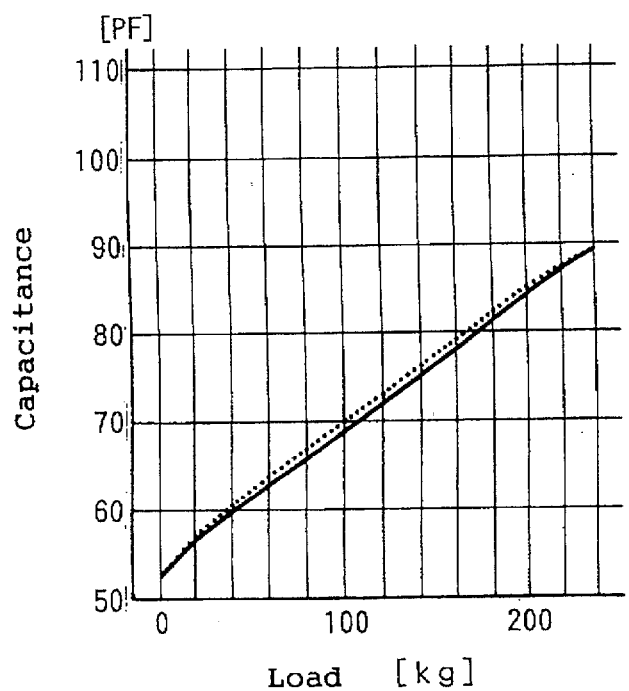

[Fig 16]
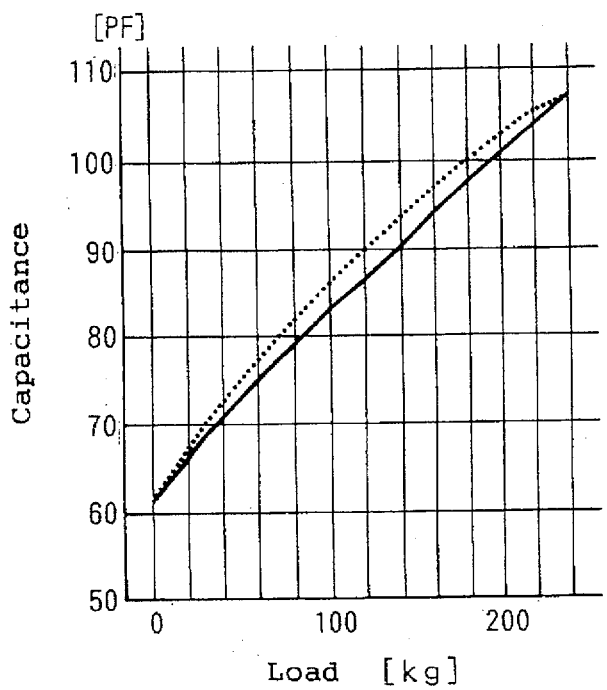
[Fig 17]
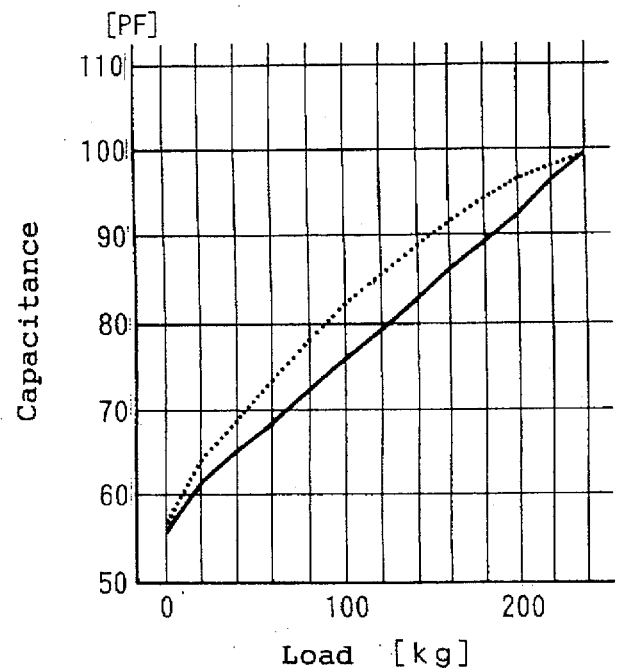

[Fig 18]
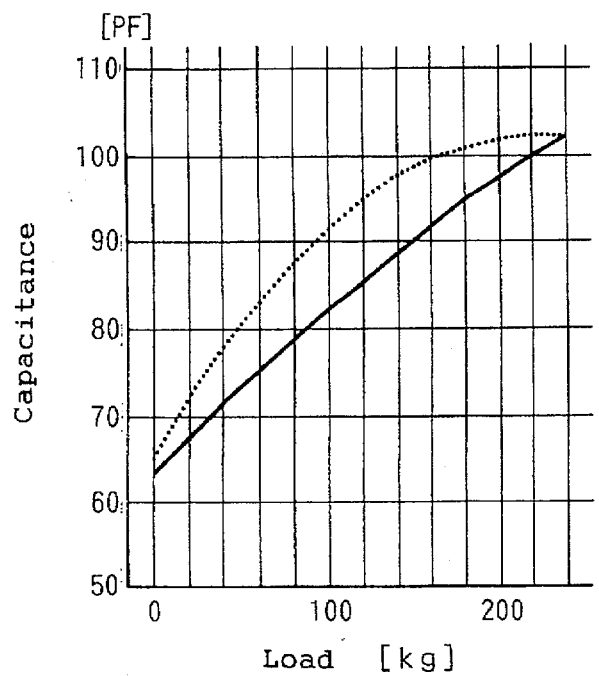
[Fig 19]
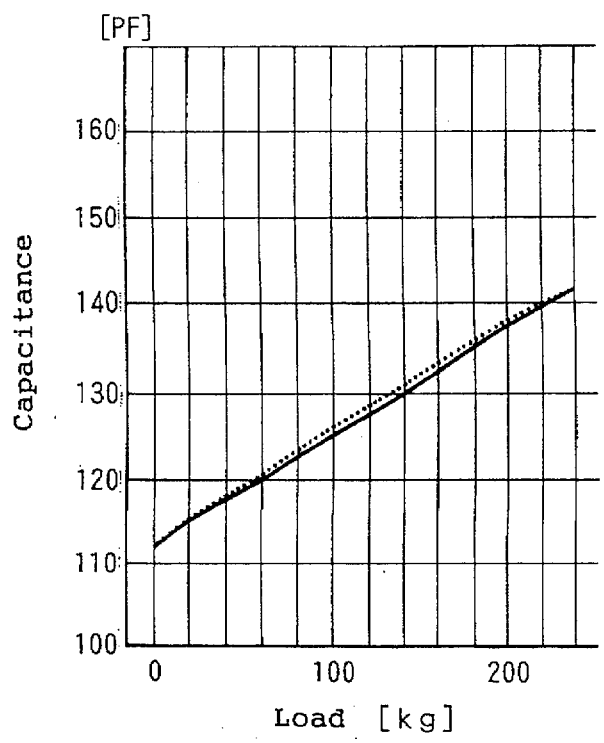

[Fig 20]
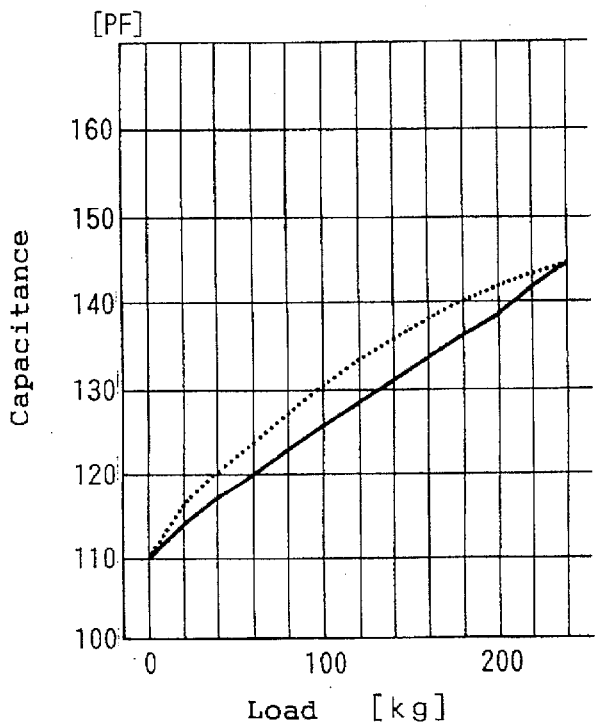
[Fig 21]
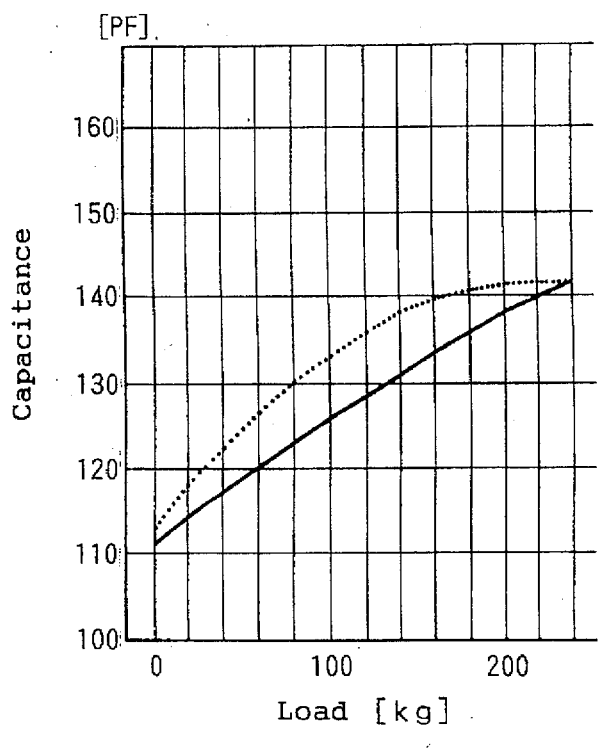

[Fig 22]
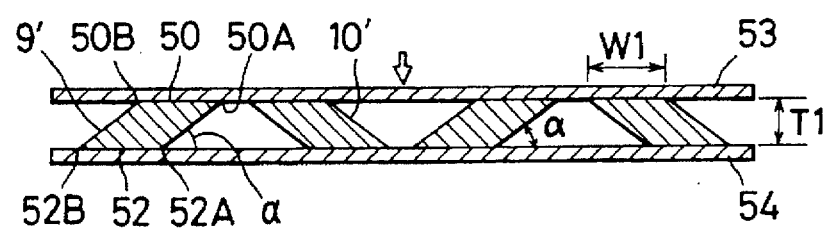
[Fig 23]
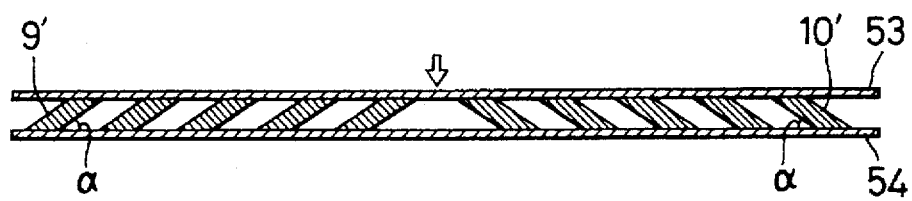

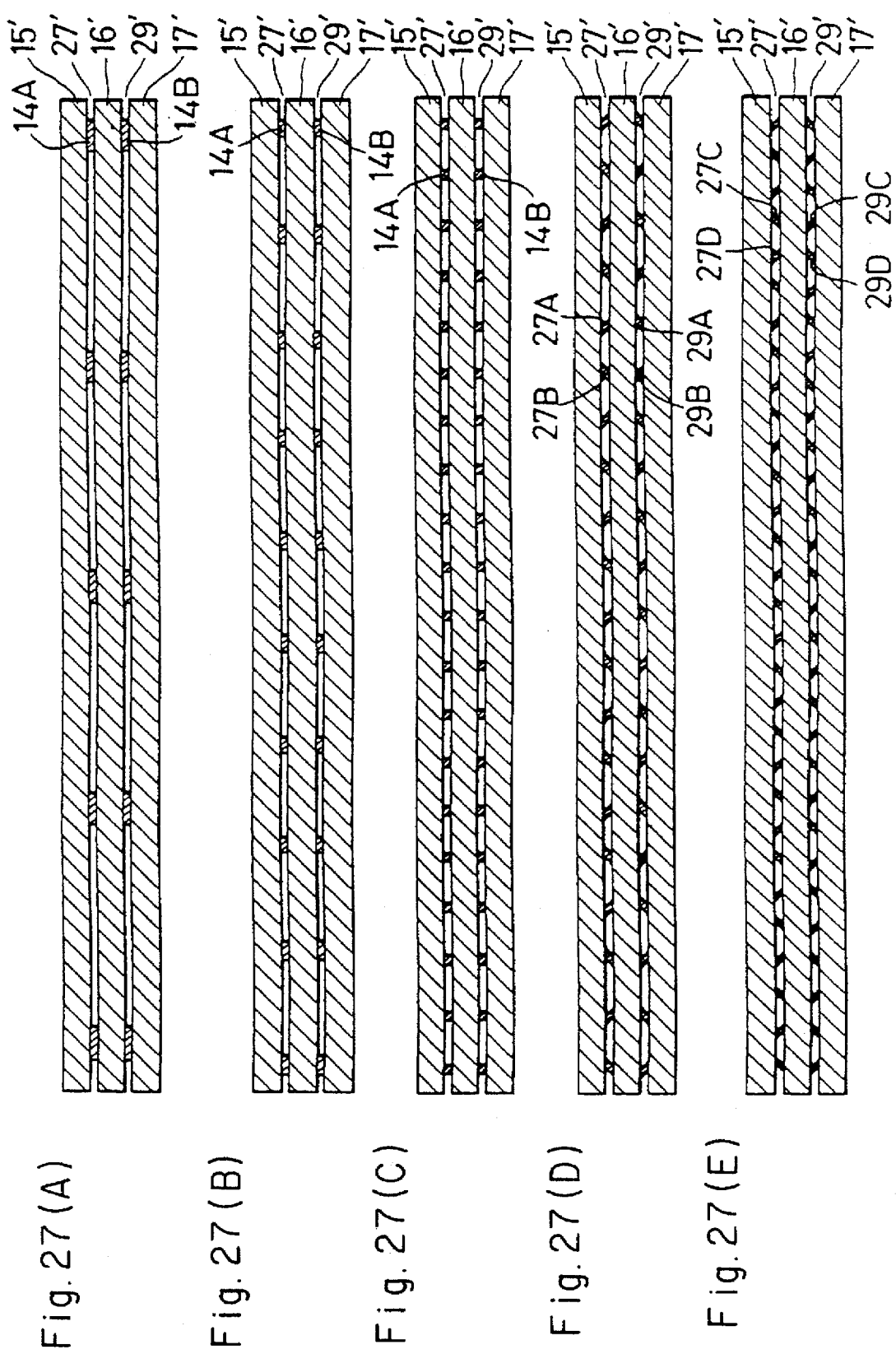

[Fig 28]
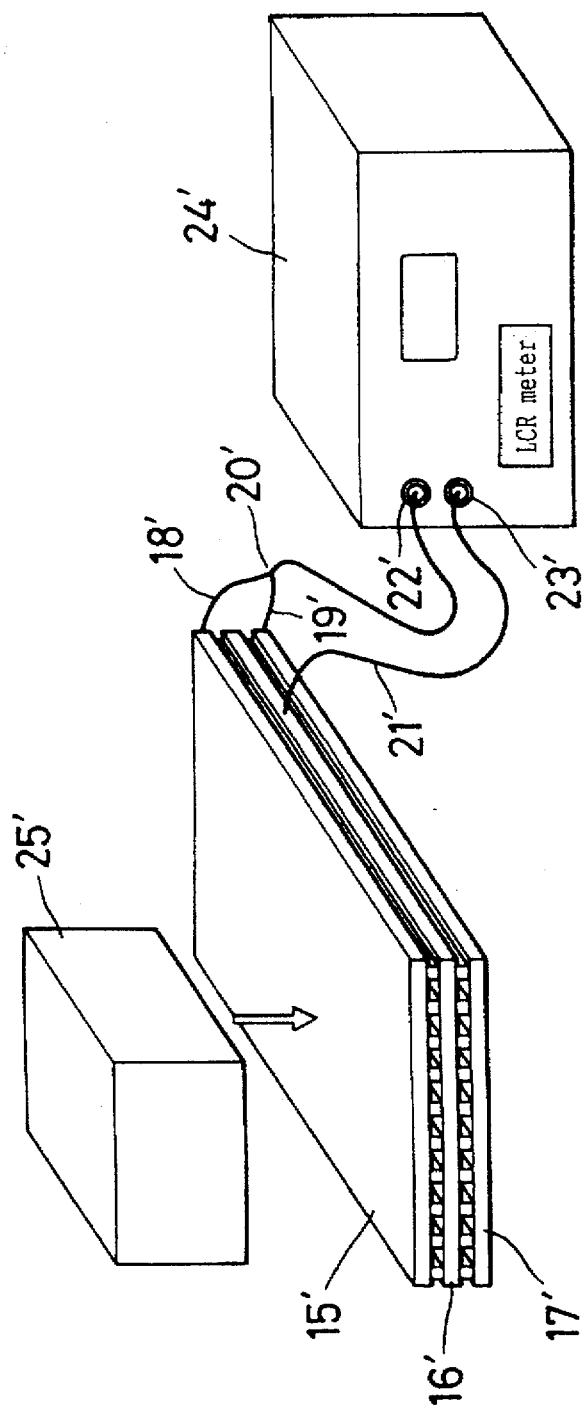

[Fig 29]
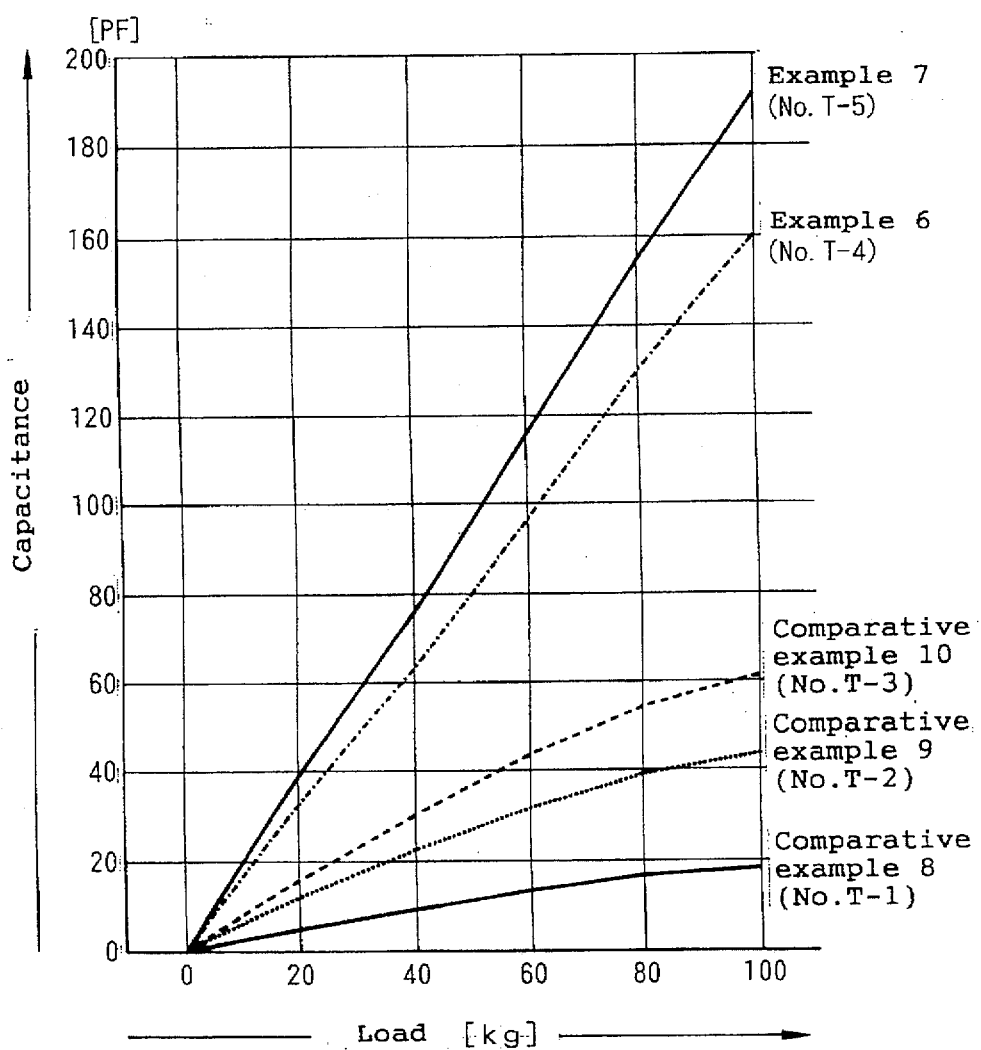

[ Fig 31 ]
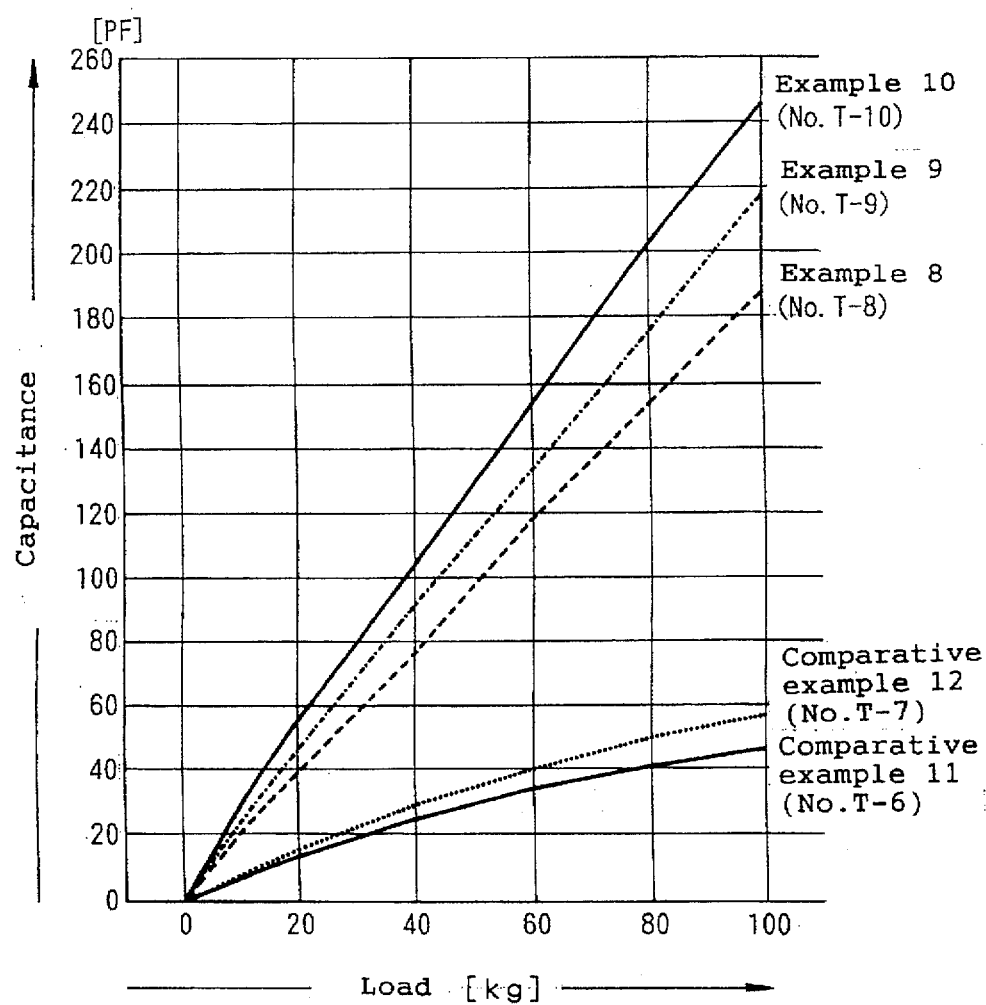

[Fig 32]
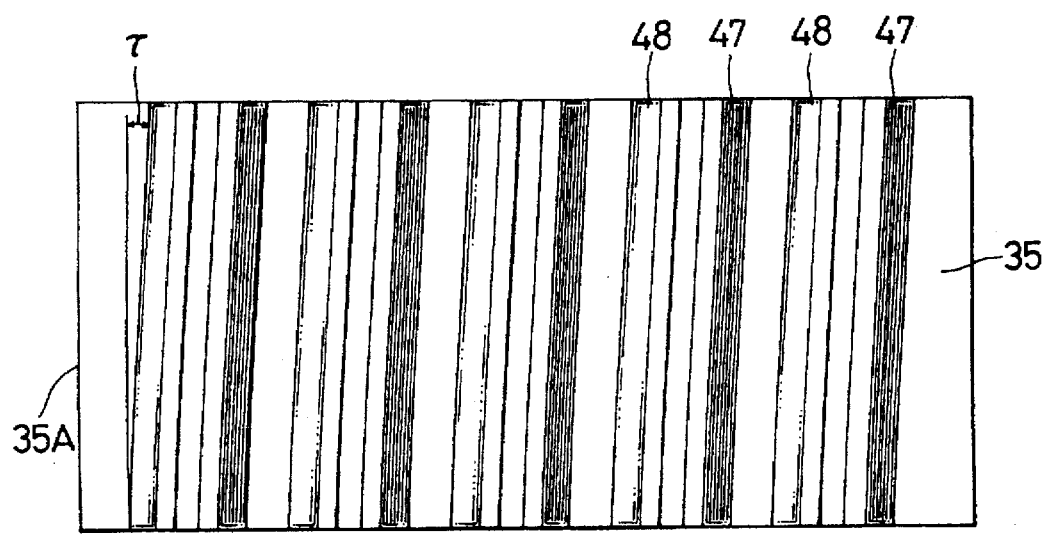
[Fig 33]
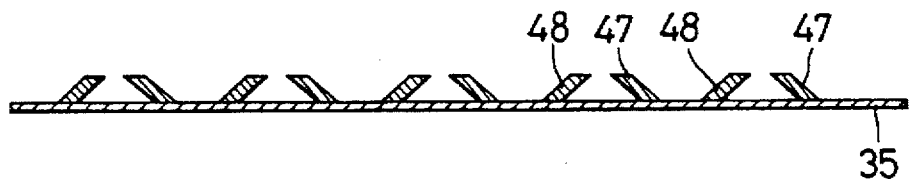

[Fig 34]
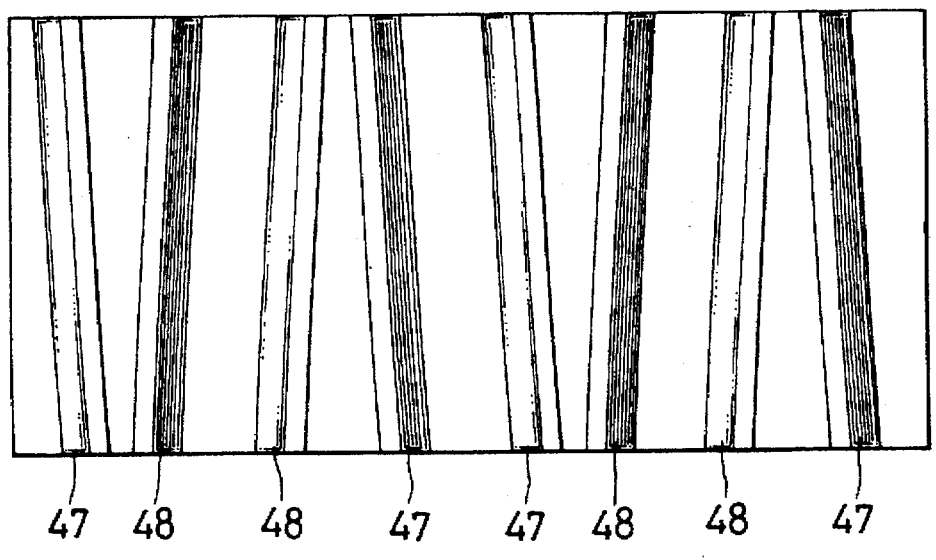
47  48   48   47   47  48   48   47
[Fig 35]
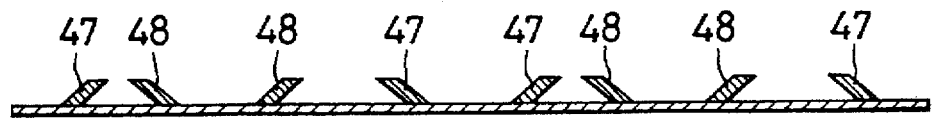

PRESSURE SENSOR

FIELD OF THE INVENTION

The present invention relates to a pressure sensor which contains a dielectric layer comprising a rubber elastic body. The rubber elastic body is capable of being elastically deformed in order to undergo change in electrostatic capacity upon being pressed, and the change in electrostatic capacity is utilized to measure the pressure applied thereto. More particularly, the present invention relates to a pressure sensor which enables the measurement of either weight or pressure with high accuracy, without employing any complicated structure.

BACKGROUND OF THE INVENTION

A conventional pressure sensor for detecting pressure often utilizes a load cell. The load cell-using pressure sensors are generally grouped into two types: a first being a type wherein a strain gauge is pasted to an elastic body to constitute a pressure sensor and which utilizes change in electrical resistance. A second being a rubber mat-type which can also be used as a pressure sensor. The rubber mat-type pressure sensor has been made practical by employing a complicated structure utilizing dielectric properties of an elastic rubber body and by utilizing change in electrostatic capacity for relieving the hysteresis which is generated by an elastic rubber body when pressure is applied to or removed from the elastic body. (See, Japanese Examined Patent Publication No. 50-19057.)

Further, a pressure sensor device has been proposed in Japanese Examined Utility Model Publication No. H 5-35303 wherein hysteresis, which is essential to rubber, is relieved with the aid of a completely elastic body such as a metal spring, and a rubber with a high dielectric constant is employed to enhance pressure sensitivity. The completely elastic body, such as a metal spring, also serves to improve reproducibility because of its restoring force.

However, pressure sensors using a load cell have the problems that both of the load cell-using types require a complicated structure and that, since steel-made springs are mainly used as the elastic bodies, they are too heavy, thick, and expensive, and are liable to suffer deterioration in precision upon being shocked, for example, upon being dropped.

Rubber mat-type pressure sensors described hereinbefore have the problem that, since they utilize simple compression, i.e., deformation of a rubber elastic body, they are seriously affected by the hysteresis essential to the elastic rubber body, unless a special mechanism for relieving the hysteresis is employed. Therefore, as they are produced, they generate inconsistent outputs due to lot-to-lot variation, and must be checked one-by-one to adjust or correct the output by electrical treatment. Thus, their production requires a large amount of complicated work.

In addition, with the rubber mat type pressure sensors, the deformation amount, upon being pressed, is comparatively small in comparison with other types of pressure sensors. Hence, only a small output is obtained per unit area and, in order to obtain a larger amount of variation of capacitance as a condenser, a large amount of mat area is necessary. Thus, downsizing of the rubber mat type pressure sensors to the size of a load cell type pressure sensor has been difficult.

Further, the pressure sensor devices using a rubber elastic body with a high dielectric constant have the problem that, since the dielectric layer, comprising a rubber elastic body, is formed by adding a large amount of a component having a high dielectric constant such as barium titanate to a non-polar rubber (300 to 800 parts by weight per 100 parts by weight of non-polar rubber) for enhancing the dielectric constant of the layer, it shows such a large hysteresis, as well as a high dielectric constant, that a completely elastic body, such as a metal spring, must be used in combination to relieve the hysteresis so as to assure restoring properties and sufficient precision, even after repeated uses. Thus, a complicated structure is required.

Heretofore, as is shown in FIG. 39, the dielectric layer 7' has a rectangular section taken along the longitudinal direction (crossing at right angles to the electrode layer surface), and is deformed only in the simple compression direction (vertical direction in FIG. 39). Thus, as is shown in FIG. 40, though capacitance of the dielectric layer 7' changes in a linear manner in the initial deformation area A, the capacitance does not change in a linear manner in the region B passing point P where the capacitance is required to change in a linear manner. Additionally, in FIG. 39, numerals 6' and 8' represent a first electrode layer and a second electrode layer, respectively.

It may be considered to decrease the ratio of width W to thickness T of the dielectric layer 7' shown in FIG. 39 so as to increase the amount of variation of capacitance upon the same load being applied. In such a case, however, deformation behavior of the dielectric layer 7' becomes so unstable that the problem arise that the first electrode layer 6' and the second electrode layer 8' shift in either the right or left direction in FIG. 39.

In addition, the rubber constituting the dielectric layer is a visco-elastic material and hence, it shows hysteresis. The pressure sensor must use a completely elastic body other than rubber, such as a metal spring, as an aid to keep enough precision as a pressure sensor. Thus, the pressure sensor is required to have a complicated structure.

An object of the present invention is to provide a pressure sensor which enables the measurement of either pressure or weight with a high accuracy, without requiring any complicated structure.

SUMMARY OF THE INVENTION

The present invention is provided to attain the above-described object. According to one embodiment of the invention, the present invention includes the following features.

That is, according to the present invention, a pressure sensor is provided which comprises a pair of electrode layers and a dielectric layer composed of a rubber elastic body positioned between the pair of electrode layers and also functioning as a spacer for the electrodes. The dielectric layer shows a tan δ of 1 to 30 Hz at a temperature of 10° to 30° C. of 0.03 or less and has a rubber hardness of 20° to 80° in terms of scale A according to JIS-K-6301 at 10° to 30° C.

Further, according to the present invention, the pressure sensor as described in claim 1 is provided, which has an impact resilience of 75% or more measured according to JIS-K-6301 at 10° to 30° C.

Still further, according to the present invention, the pressure sensor as described in claim 1 is provided, which has a compression set of 3% or less measured according to JIS-K-6301 at 10° to 30° C.

Still further, according to the present invention, the pressure sensor as described in claims 1 is provided, wherein the dielectric layer is formed by any one of a group of material including natural rubber, polybutadiene rubber, polyisoprene rubber, polyurethane rubber and silicone rubber.

According to another embodiment of the invention, the present invention includes the following features.

That is, according to the present invention, a pressure sensor is provided which comprises a first electrode layer and a second electrode layer positioned parallel to each other. A dielectric layer made of rubber elastic body in a continuous length spaces the two electrode layers from each other with one surface of the dielectric layer being in close contact with the first electrode layer and the other opposite surface of the dielectric layer being in close contact with the second electrode layer. The dielectric layer is formed so that one of the contact surfaces is shifted from the other opposite contact surface when viewed in the direction crossing at right angles to the electrode layer.

Still further, according to the present invention, a pressure sensor as described in claim 3 is provided, wherein the dielectric layer has an almost parallelogramic cross-section taken along the plane crossing at right angles to the longitudinal direction of the dielectric layer.

Still further, according to the present invention, a pressure sensor as described in claim 4 is provided, wherein a plane crossing at right angles to the first and the second electrode layers crosses at an angle of 30° to 85° C. to the dielectric layer.

Still further, according to the present invention, a pressure sensor as described in claim 3 is provided, wherein one side plane of the dielectric layer crosses at an angle of 30° to 85° to the second electrode layer, and the other opposite side plane of the dielectric layer crosses at an angle of 90° to 145° to the second electrode layer.

Still further, according to the present invention, a pressure sensor as described in claim 3 is provided, wherein the dielectric layer comprises a first dielectric layer piece and a second dielectric layer piece disposed so that, when pressure is applied to the sensor in the vertical direction with respect to the surfaces of the first and second electrode layers, shifting forces respective to the electrode layers are cancelled out.

Still further, according to the present invention, a pressure sensor as described in claim 7 is provided, wherein the number of the first dielectric layer piece(s) is almost the same as the number of the second dielectric layer piece(s).

Still further, according to the present invention, a pressure sensor as described in claim 3 is provided, wherein a quotient, obtained by dividing the length of the contact surface in the direction crossing at right angles to the longitudinal direction of the dielectric layer, by the distance between the first and the second electrode layers, is 0.2 to 5.0.

Still further, according to the present invention, a pressure sensor as described in claim 3 is provided, wherein the dielectric layer has a rubber hardness of 20° to 80° measured in terms of scale A according to JIS-K-6301.

Still further, according to the present invention, a pressure sensor as described in claim 3 is provided, wherein the distance between the first electrode layer and said second electrode layer is 0.2 to 5.0 mm.

Still further, according to the present invention, a pressure sensor as described in claim 3 is provided, wherein three or more odd-numbered electrode layers are provided, with the dielectric layer being closely disposed between each pair of the electrode layers.

BRIEF DESCRIPTION OF THE DRAWINGS

FIG. 2 is a perspective view showing the state of measuring capacitance of a pressure sensor.

FIG. 2(b) is a perspective view of a pressure sensor.

FIG. 4 is a perspective view showing the state of measuring capacitance of a pressure sensor.

FIG. 5 is a graph showing the relationship between load applied to the pressure sensor of Example 1 and change in capacitance.

FIG. 6 is a graph showing the relationship between load applied to the pressure sensor of Example 2 and change in capacitance.

FIG. 7 is a graph showing the relationship between load applied to the pressure sensor of Example 3 and change in capacitance.

FIG. 8 is a graph showing the relationship between load applied to the pressure sensor of Comparative Example 1 and change in capacitance.

FIG. 9 is a graph showing the relationship between load applied to the pressure sensor of Comparative Example 2 and change in capacitance.

FIG. 10 is a graph showing the relationship between load applied to the pressure sensor of Example 1 and change in capacitance.

FIG. 11 is a graph showing the relationship between load applied to the pressure sensor of Example 2 and change in capacitance.

FIG. 12 is a graph showing the relationship between load applied to the pressure sensor of Example 3 and change in capacitance.

FIG. 13 is a graph showing the relationship between load applied to the pressure sensor of Comparative Example 1 and change in capacitance.

FIG. 14 is a graph showing the relationship between load applied to the pressure sensor of Comparative Example 2 and change in capacitance.

FIG. 15 is a graph showing the relationship between load applied to the pressure sensor of Example 4 and change in capacitance.

FIG. 16 is a graph showing the relationship between load applied to the pressure sensor of Comparative Example 3 and change in capacitance.

FIG. 17 is a graph showing the relationship between load applied to the pressure sensor of Comparative Example 4 and change in capacitance.

FIG. 18 is a graph showing the relationship between load applied to the pressure sensor of Comparative Example 5 and change in capacitance.

FIG. 19 is a graph showing the relationship between load applied to the pressure sensor of Example 5 and change in capacitance.

FIG. 20 is a graph showing the relationship between load applied to the pressure sensor of Comparative Example 6 and change in capacitance.

FIG. 21 is a graph showing the relationship between load applied to the pressure sensor of Comparative Example 7 and change in capacitance.

FIG. 22 is a cross-sectional view showing one specific example of a second embodiment of the present invention.

FIG. 23 is a cross-sectional view showing another specific example of the second embodiment of the present invention.

FIG. 27(A) to (E) are cross-sectional views of pressure sensors.

FIG. 28 is a perspective view showing the state of measuring capacitance of a pressure sensor.

FIG. 29 is a graph showing the relationship between load and capacitance.

FIG. 31 is a graph showing the relationship between load and capacitance.

FIG. 32 is a plan view of a pressure sensor before a first electrode is applied thereto.

FIG. 33 is a side view of FIG. 32.

FIG. 34 is a plan view of a pressure sensor before a first electrode is applied thereto.

FIG. 35 is a side view of FIG. 34.

DETAILED DESCRIPTION OF THE INVENTION

Figure 1A:
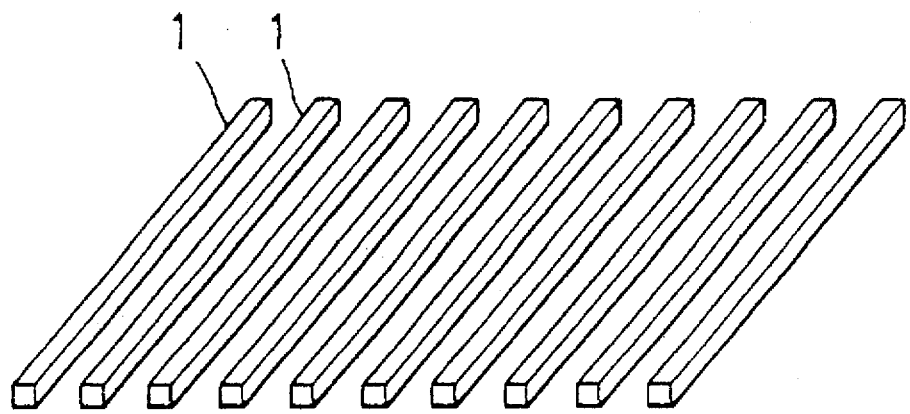
FIG. 1(a) is a perspective view of a dielectric layer.

It is well known that rubber elastic bodies show both elastic behavior and viscous behavior, thus also being called visco-elastic bodies. When repeated compression stress and tensile stress are applied from outside to a rubber elastic body, a time lag arises between stress and displacement, thus causing so-called visco-elastic behavior which generates a stress relaxation such as hysteresis or creep. However, if the viscous behavior essential to a rubber elastic body is minimized, even a rubber elastic body can be used as a spring showing almost no viscous behavior like a metal spring.

Please note that the physical properties tan δ, impact resilience, rubber hardness in terms of Scale A, and compression set which will be described in detail below are measured by Japanese Industrial Standard (JIS) K-6301 for Physical Testing Methods for Vulcanized Rubber.

Hysteresis or stress relaxation of a rubber elastic body becomes smaller as tan δ, which is one parameter of confirming visco-elastic behavior, becomes closer to zero, whereas it becomes larger as tan δ becomes larger. The term tan δ is called loss factor or loss tangent and stands for the magnitude of internal abrasion of rubbery material represented by the equation tan δ=R/X, wherein R stands for an equivalent serial resistance of a condenser in terms of Ω and X for a reactance of the condenser in terms of Ω.

In addition, hysteresis or stress relaxation becomes more reduced as compression set becomes closer to zero, but becomes more serious as compression set becomes larger. The term compression set means a permanent set of a rubber in the direction of compression. A test piece is compressed at a definite compression rate and maintained at a given temperature and a given time. A load is then released from the test piece and allowed to stand for a given time. A compression set is evaluated in terms of percent by comparing the reduced thickness of the compression deformed test piece with the original thickness. As is well known, thermoplastic elastic polymers generally have a small tan δ, thus being good elastomers with a good rubber elasticity, but many of them show a large compression set and disadvantageous hysteresis or stress relaxation.

In order to attain the same spring behavior as a metal spring, it is most important for the polymer to show a high impact resilience measured according to JIS-K6301, a small tan δ, and a small compression permanent strain. The term impact resilience is defined in terms of freely dropping a given weight onto the surface of a rubbery test piece and evaluating the internal abrasion in terms of a percentage according to the height of the weight on the rebound.

With the above-described points in mind, the inventors have made investigations to minimize the viscous behavior by selecting a proper polymer and designing a proper rubber composition, taking the molecular structure of the rubber elastic body into consideration and as a result, have developed a rubber elastic body having the physical properties described in claim 1 and have confirmed that the rubber elastic body shows such a minimized viscous behavior that it can be used for a pressure sensor.

As a result of investigations checking the performance as a pressure sensor of the rubber elastic bodies by changing composition formulations, taking well-known molecular structure into consideration, it has been found that natural rubber, polyisoprene rubber, polybutadiene rubber, and silicone rubber are suitable material for use as pressure sensors. Thus, the inventors have determined that the rubber materials described in claim 2 provide rubber elastic body materials enabling one to attain the physical properties described in claim 1, is composition formulation or similar is properly selected. Of the types of rubbers listed above, silicone rubber is one of the optimal rubbers, since it undergoes only a small change in spring constant from a lower temperature zone to a higher temperature zone with time, and shows a higher rubber elasticity than other rubber elastic body materials, i.e, a small tan δ and a small compression set. Hence, a pressure sensor produced using polyurethane rubber has a higher sensitivity than that produced by using other material. Thus, polyurethane rubber in an effective material for the pressure sensor.

In connection with the invention described in claim 1, hysteresis of the pressure sensor is liable to become large when tan δ exceeds 0.03 or when rubber hardness in terms of scale A, measured according to JIS-K6301, is outside the range of from 20° to 80°. The term rubber hardness in terms of scale A is the value of the scale of a spring hardness tester when a load of 1000 gf is applied by the hardness tester to a test piece of rubber having a thickness of at least 2 mm.

In connection with the invention described in claim 1, compression set is liable to become large when impact resilience measured according to JIS-K-6301 at 10° to 30° C. is less than 75%.

Further, in connection with the invention described in claim 1, hysteresis of a pressure sensor is liable to become large when compression set measured according to JIS-K6301 at 10° to 30° C. is larger than 3%.

The pressure sensor described in claim 3 comprises a first electrode layer and a second electrode layer disposed parallel to each other and a dielectric layer between the two layers. The dielectric layer is formed in a continuous length and is composed of a rubber elastic body, and functions to space the two electrode layers from each other, with one surface being in close contact with the first electrode layer and the other opposite surface being in close contact with the second electrode layer. In the invention described in claim 3, the dielectric layer is formed so that one of the contact surfaces is shifted from the other opposite contact surface when viewed in the direction crossing at right angles to the electrode layer.

The pressure sensor, in accordance with the present invention, does not require the aid of a completely elastic body such as a metal spring. That is, it enables measurement with a high accuracy in spite of its simple structure.

In the invention described in claim 3, the dielectric layer undergoes shearing deformation when a load is applied thereto in the direction crossing at right angles to each surface of the first and the second electrode layers, across which a voltage is applied. Thus, enough deformation amount is assured. Therefore, a region is broadened wherein capacitance changes in a linear manner as the first electrode layer and the second electrode layer migrate nearer to, or farther from, each other. Thus, detection sensitivity is improved.

Figure 26A:
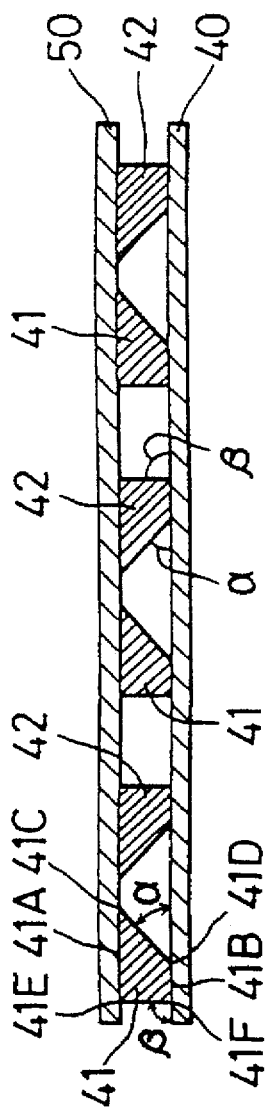
FIG. 26(A) to (D) are cross-sectional views of pressure sensors.

Additionally, in the present invention, the phrase "one of the contact surfaces between one surface of the dielectric layer and the first electrode layer is shifted from the other opposite contact surface between the other opposite surface of the dielectric layer and the second electrode layer" includes the case wherein, as shown in FIG. 22, one side 50A of the contact surface 50 is shifted from one side 52A of the contact surface 52, and another side 50B of the contact surface 50 is shifted from another side 52B of the contact surface 52 in the horizontal direction in FIG. 22, and also includes the case shown in FIG. 26(A).

That is, in FIG. 26(A), one side 41E of the contact surface 41A is almost at the same position as one side 41F of the contact surface 41B in the horizontal direction in FIG. 26, and only another side 41C of the contact surface 41A is shifted from another side 41D of the contact surface 41B in the horizontal direction in FIG. 26.

Additionally, in FIG. 22, numeral 53 designates a first electrode layer, 54 a second electrode layer, 9' a first dielectric body piece, and 10' a second dielectric body piece. In FIG. 26(A), numeral 39 designates a first electrode layer, 40 a second electrode layer, 41 a first dielectric body piece, and 42 a second dielectric body piece. Additionally, the first dielectric body piece 9' and the second dielectric body piece 10' are disposed so that they are in a horizontally symmetrical position with respect to the cross-sectional shape. Similarly, the first dielectric body piece 41 and the second dielectric body piece 42 are disposed so that they are in a horizontally symmetrical position with respect to the cross-sectional shape.

The pressure sensor described in claim 4 has a dielectric layer having a cross-sectional shape which is almost a parallelogram when taken along the plane crossing at right angles to the longitudinal direction of the dielectric layer. Since the dielectric layer is formed in a shape of shearing deformation, the range wherein capacitance changes in a linear manner can be broadened due to the same reason as with claim 1. Thus, detection sensitivity is improved.

The pressure sensor described in claim 5 is configured so that a plane crossing at right angles to the first and the second electrode layers crosses at an angle of 30 to 85 degrees, preferably 45 degrees, to the dielectric body layer. A sufficient shearing deformation amount of the dielectric layer is assured because of the above-described structure. It is possible to change the angle to 90 degrees or to about 0 degrees at which the electrode layers and the dielectric layer are in an almost parallel position to each other. However, if the angle exceeds 85 degrees, a ratio of the compression deformation tends to increase whereas a ratio of the shearing deformation tends to decrease. On the contrary, if the angle is less than 30 degrees, the ratio of compression deformation tends to increase. Thus, adhesion breakage with the electrode layer possibly takes place.

The pressure sensor described in claim 6 is configured so that one side plane of the dielectric layer crossing both the first and the second electrode layer crosses at an angle of 30 to 85 degrees to the second electrode layer, and the other opposite side plane of the dielectric layer crosses at an angle of 90 to 145 degrees to the second electrode layer. A sufficient shearing deformation amount of the dielectric body layer is assured because of the above-described structure. If the former and the latter angles are outside the above-described ranges, that is, if the angles exceed the above-described ranges, a ratio of compression deformation tends to increase whereas a ratio of shearing deformation tends to decrease and, if the angles are smaller than the lower limits, an adhesion breakage tends to take place.

In the pressure sensor described in claim 7, the dielectric layer comprises a first dielectric layer piece and a second dielectric layer piece disposed so that, when pressure is applied to the sensor in the vertical direction with respect to the surfaces of the first and second electrode layers, forces of shifting respective electrode layers are cancelled out.

The above-described structure of the pressure sensor described in claim 7 serves to prevent the first and the second electrode layer from shifting in a direction different from the pressure-applying direction upon the dielectric layer being deformed.

The pressure sensor described in claim 8 is configured so that the number of the first dielectric layer piece(s) is almost the same as the number of the second dielectric layer piece(s). Since the effect of preventing the first electrode layer from shifting in a direction different from the pressure-applying direction and the effect of preventing the second electrode layer from shifting in a direction different from the pressure-applying direction are almost the same, the two electrode layers are prevented from shifting.

In addition, in the pressure sensor described in claim 9, a quotient, obtained by dividing the length of the contact surface in the direction crossing at right angles to the longitudinal direction of the dielectric layer, by the distance between the first and the second electrode layers, is 0.2 to 5.0. This serves to facilitate production of the pressure sensors.

If the quotient is less than 0.2, production of the pressure sensor tends to become difficult whereas, if more than 5.0, a ratio of compression deformation tends to increase, with a ratio of shearing deformation decreasing.

In the pressure sensor described in claim 10, the dielectric layer has a rubber hardness of 20 to 80 degrees measured in terms of scale A according to JIS-K-6301, whereby various general-purpose pressure sensors, of from a pressure sensor whose maximum measurable weight is about 10 kg to a pressure sensor whose maximum measurable weight is 1000 kg, can be manufactured.

In the invention described in claim 11, distance between the first electrode layer and the second electrode layer is 0.2 to 5.0 mm, which serves to facilitate production of the pressure sensors with less differences therebetween.

In the invention described in claim 12, three or more odd-numbered electrode layers are provided, with the dielectric layer being closely disposed between each pair of electrode layers. Accordingly, in this invention, sufficient sensitivity can be obtained without any damage of the pressure sensor, even when the dielectric layer is deformed too much due to too much load applied thereto to a degree of the region where the dielectric layer is deformed in a linear manner, or even when the dielectric layer is similarly deformed too much to possibly be damaged.

One embodiment of the present invention is described in more detail by reference to Examples.

EXAMPLES 1 TO 3 AND COMPARATIVE EXAMPLES 1 AND 2

In order to confirm the relationship between tan δ or compression set and hysteresis, raw rubber samples were prepared by using polybutadiene rubber as a rubber material, compounding various components to attain a rubber hardness after vulcanization of 40 degrees measured in terms of scale A according to JIS-K-6301, and kneading the resulting composition in a roll of kneading rubber. Each raw rubber sample was press molded by electrical heating under the conditions of 165° C.×15 minutes and 200 kg/cm² to prepare vulcanized rubber sheet samples of 1.5 mm in thickness, 150 mm in width, and 200 mm in length.

Compounding formulations for the raw rubber materials used in Examples 1 to 3 and Comparative Examples 1 and 2 are as shown in Table 1.

Observed values of rubber hardness of the vulcanized rubber sheet samples obtained in Examples 1 to 3 and Comparative Examples 1 and 2, measured in terms of scale A at 25° C. according to JIS-K-6301, tan δ values at 10 Hz measured at 25° C. by an automatic dynamic visco-elasticity-measuring apparatus, DDV-25FP, made by ORIENTEC, and compression set values measured at 25° C. according to JIS-K-6301 are tabulated in the lower part of Table 1.

Figure 1B:
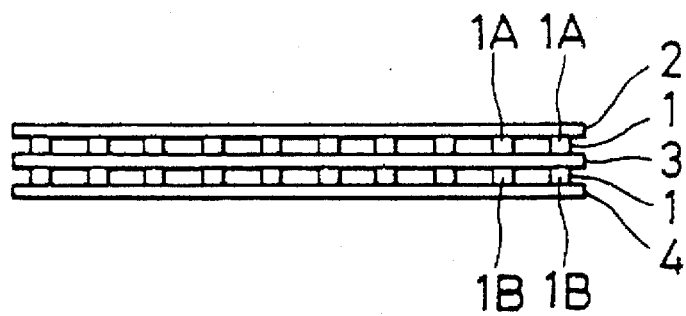
FIG. 1(b) is a cross-sectional view of a pressure sensor, wherein dielectric layer pieces, disposed as an upper layer and a lower layer, are parallel to each other.
Figure 1C:
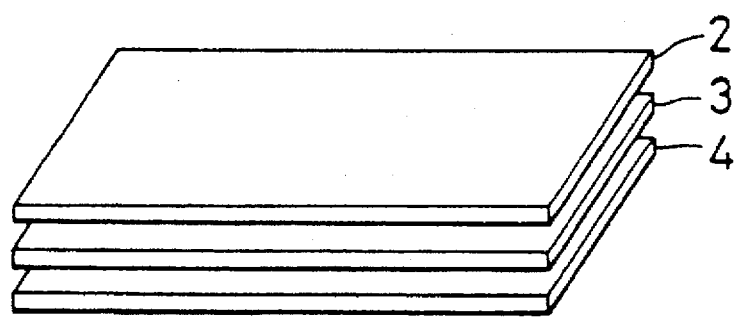
FIG. 1(c) is a perspective view of electrode layers.

Then, each of the vulcanized sheet samples was cut into strip pieces of 1.5 mm in thickness, 1.5 mm in width, and 200 mm in length as shown in FIG. 1(a). The thus cut 20 strip pieces were adhesively placed between a first electrode layer 2, a second electrode layer 3, and a third electrode layer 4 shown in FIG. 1(C) using a urethane series two-part adhesive to prepare test samples of Examples 1 to 3 and Comparative Examples 1 and 2 as shown in FIG. 1(b). In each test sample, dielectric pieces 1A constituting the upper dielectric layer 1 and dielectric pieces 1B constituting the lower dielectric layer were parallel to each other as shown in FIG. 1(b).

Additionally, as the electrode layers, aluminum-made planar plates of 200 mm in width, 250 mm in length, and 5 mm in thickness were used.

Each test sample was connected to a precision LCR meter, HP4284, made by Hewlett Packard Company in such a manner as that shown in FIG. 2. The first electrode layer 2 and the second electrode layer 4 were connected to one output terminal 9 of the precision LCR meter via a connecting portion 8 using wire cords 6 and 7, and the remaining second electrode 3 was connected to the other output terminal 11 of the LCR meter through a wire cord 10, and an alternating current voltage of 1 MHz 6 V was applied thereacross to measure capacitance.

Then, a 20-kg weight or weights 12 were placed in piles on each of the thus connected test samples in numbers of one, two, three, four and five to apply loads of 20 kg, 40 kg, 60 kg, 80 kg and 100 kg, respectively. Capacitance of each test sample under each load was measured 7 times. Maximum and minimum values for each load were plotted to obtain the graphs shown in FIGS. 5 to 9. In the FIGS., (a) is a curve obtained by plotting maximum values of capacitance, and (b) is a curve obtained by plotting minimum values.

Additionally, FIG. 5 is a graph showing the results of the measurement in Example 1, FIG. 6 is a graph showing the results of the measurement in Example 2, FIG. 7 is a graph showing the results of the measurement in Example 3, FIG. 8 is a graph showing the results of the measurement in Comparative Example 1, and FIG. 9 is a graph showing the results of the measurement in Comparative Example 2.

What is important for a pressure sensor to do is to produce outputs with a good reproducibility with extremely small scattering. It is proved, by comparing the difference between the maximum value and the minimum value for a load of 100 kg shown in FIGS. 5 to 9, that test samples showing smaller tan δ tend to show a smaller difference between the maximum values and the minimum values and therefore, smaller hysteresis.

That is, the difference between the maximum value and the minimum value with the test sample of Example 1 (tan δ=0.01) is 1 PF, whereas that with the test sample of Comparative Example 2 (tan δ=0.043) is 8 PF.

Therefore, assuming manufacture of pressure sensors for measuring a weight of up to 100 kg for measuring pressure of pressure rubber rolls of a printing press, the test sample in Example 1 enables one to manufacture a pressure sensor which shows a change in capacitance of 0.68 PF per kg since its capacitance changed from 0 to 68 PF when weights were placed thereon in piles up to 100 kg. Thus, in the case of measuring a weight of 100 kg using this pressure sensor, scattering width is as small as about 1.5 kg due to the difference between the maximum value and the minimum value being only 1 PF, which means that pressure change can be read by at least 2 kg unit. In addition, a pressure sensor capable of measuring the maximum weight of 100 kg with a minimum reading unit of 2 kg, which has a light weight and a simple structure composed of a dielectric layer rubber and electrode plates and yet is difficult to break, can be manufactured at a low cost.

On the other hand, in the case of manufacturing pressure sensor capable of measuring the weight of 100 kg using the test sample of Comparative Example 2, a pressure sensor is manufactured which shows a change in capacitance of 0.48 PF per kg since its capacitance changed from 0 to 48 PF when weights were placed thereon in piles up to 100 kg. Thus, in the case of measuring a weight of 100 kg using this pressure sensor, the scattering width is as large as about 16.6 kg due to the difference between the maximum value and the minimum value for 100 kg being 8 PF, which means that pressure change can be read with a poor precision only by 15 kg to 20 kg unit at the very least. Accordingly, only the test samples of Examples 1 to 3 can provide pressure sensors with little scattering, and a suitable tan δ can be concluded to be 0.03 or less for this reason.

In addition, as is well known, there is no relationship between tan δ and compression set with respect to thermoplastic elastic bodies. In the case of vulcanized rubber elastic bodies having a cross-linked structure, however, there is a close relationship between tan δ and the compression set properties. That is, the smaller the tan δ, the smaller the compression set, with smaller compression set being preferred.

With respect to impact resilience, it is closely related to tan δ with both the thermoplastic elastic bodies and the vulcanized rubber elastic bodies having a cross-linked structure. That is, the smaller the tan δ, the larger the impact resilience, with larger impact resilience being preferred. With the vulcanized rubber elastic bodies having a cross-linked structure, however, impact resilience is in close relationship to compression set as is well known, and a material having a larger impact resilience shows a smaller compression set, thus being preferred.

It has been concluded, based on the thus obtained results with the above-described facts in mind, that compression set, as one parameter of the rubber elastic bodies for obtaining good pressure sensors, be most preferably 3% or less, and impact resilience be brought as near to 100% as possible, with an impact resilience of 75% or more being most preferred.

Then, the relationship between either tan δ or compression set and hysteresis was examined by continuously conducting application and removal of pressure.

In this examination, the aforesaid test samples of Examples 1 to 3 and Comparative Examples 1 and 2 were again used. The same tests as described hereinbefore were conducted using the same testing apparatus. That is, after measuring capacitance for 0 kg without the weight, pressures were applied thereto in a continuous progression from 20 kg to 40 kg to 60 kg to 80 kg to 100 kg using the same weights. Then, weights were regressively removed one by one to apply weights of 80 kg, 60 kg, 40 kg, 20 kg, and 0 kg to measure capacitance to obtain the graphs shown in FIGS. 10 to 14. Additionally, FIG. 10 shows the results of the measurement in Example 1, FIG. 11 shows the results of the measurement in Example 2, FIG. 12 shows the results of the measurement in Example 3, FIG. 13 shows the results of the measurement in Comparative Example 1, and FIG. 14 shows the results of the measurement in Comparative Example 2.

It can be seen, from FIGS. 10 to 14, that the test sample of Example 1 showed the least hysteresis, whereas the test sample of Comparative Example 2 showed the largest hysteresis, and that a larger tan δ gave a larger hysteresis.

Additionally, the test samples of Examples 1 to 3 were found to show similar tendencies in various pressure-applying tests, and it was found that the best results were obtained when pressure sensors had a tan δ of 0.02 or less, a compression set of 3% or less, and an impact resilience of 75% or more.

TABLE 1

| | Formulation | Example 1 | Example 2 | Example 3 | Comparative Ex. 1 | Comparative Ex. 2 |
|---|---|---|---|---|---|---|
| 1 | JSR BR-01 | 100 | 100 | 100 | 100 | 100 |
| 2 | Active Zinc Flower | 5.0 | 5.0 | 5.0 | 5.0 | 5.0 |
| 3 | Stearic Acid | 0.5 | 0.5 | 0.5 | 0.5 | 0.5 |
| 4 | Antioxidant 3C | 0.5 | 0.5 | 0.5 | 0.5 | 0.5 |
| 5 | Di-cup-40-C | 6.0 | 6.0 | 6.0 | 6.0 | 6.0 |
| 6 | Diana PX-90 | 7 | 14 | 25 | 32 | 39 |
| 7 | Nipsil VN3 | 2 | 6 | 13 | 24 | 37 |
| 8 | Precipitated Sulfur | 1.0 | 1.0 | 1.0 | 1.0 | 1.0 |
| Physical Properties of Vulcanized Rubber | | | | | | |
| *1 | | 40 | 40 | 40 | 40 | 40 |
| *2 | | 0.010 | 0.018 | 0.025 | 0.037 | 0.043 |
| *3 | | 86% | 78% | 72% | 68% | 63% |
| *4 | | 1.0% | 2.6% | 3.4% | 5.8% | 6.8% |

(*1: Hardness degree; *2: tan δ; *3: Impact resilience; *4: Compression set)

EXAMPLE 4 AND COMPARATIVE EXAMPLES 3 TO 5

Then, tan δ, impact resilience, permanent set, and hysteresis were measured using commercially available silicone rubbers of grades of 50 degrees in rubber hardness having different physical properties. As is shown in Table 2, compounding procedures were conducted according to the formulations specified by manufacturers, and each of the resulting compounds were kneaded, and were subjected to press molding by applying electrical heating at 170° C. for 10 minutes under a pressure of 200 kg/cm² to prepare a vulcanized rubber sheet of 1.5 mm in thickness, 100 mm in width, and 200 mm in length, followed by additional vulcanization at 200° C. for 4 hours in an electric furnace. Then, tan δ of each sample sheet was measured.

Figure 3A:
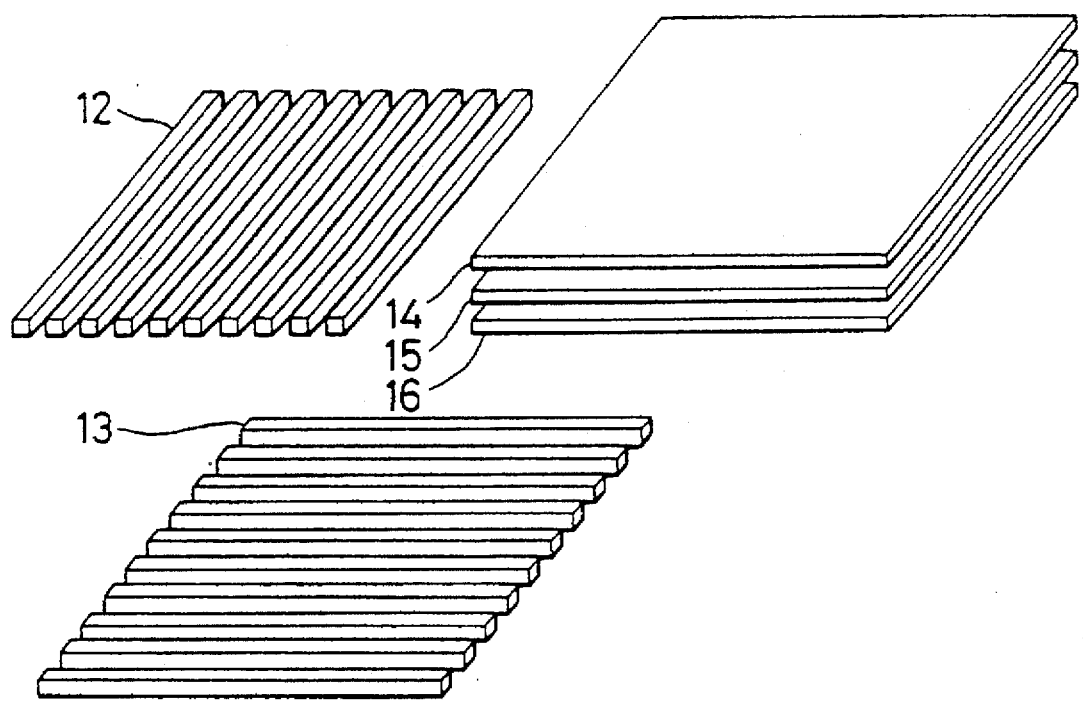
FIG. 3(a) is an analyzed perspective view of a pressure sensor.
Figure 3B:
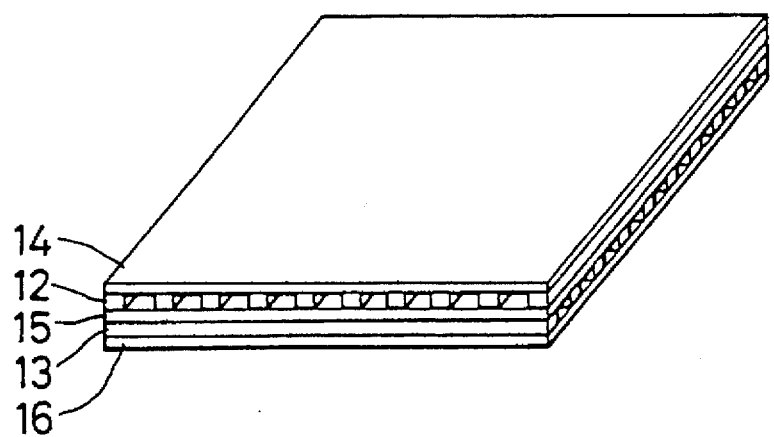

Impact resilience and compression set were measured using the samples molded under the same conditions as described above respectively in exclusive molds. Remits thus obtained were as shown in Table 2. Then, each of the vulcanized rubber sheet samples obtained in Example 4 and Comparative Examples 3 to 5 were cut into strip pieces of about 1.5 mm in thickness, 3 mm in width, and 50 mm in length having a rectangular section as shown in FIG. 3(a), i.e., first dielectric layer 12 and 13. A set of 10 pieces was adhered to the first electrode layer 14 and the second electrode layer 15 with an adhesive to form an upper dielectric layer, and another set of 10 pieces was adhered to the second electrode layer 15 and the third electrode layer 16 with adhesive to form a lower dielectric layer. The strip pieces of the upper layer crossed the strip pieces of the lower layer at an angle of 90 degrees. Thus, there were prepared test samples for Example 4 and Comparative Examples 3 to 5 (See FIG. 3(b)). Additionally, as the electrode layers for the respective samples, aluminum plates of 50 mm in length, 50 mm in width and 1.0 mm in thickness were used and, as the adhesive, an RTV series adhesive of 30 degrees in hardness was used.

Then, rubber plates 19 and 20 were respectively adhered to the first electrode layer 14 and the third electrode layer 16 using a pressure sensitive adhesive double coated tape so as to attain uniform application of pressure and electric insulation. As the rubber plates 19 and 20, EPT rubber plates of 50 mm in length, 50 mm in width and 5.0 mm in thickness and having a hardness of 60 degrees, were used.

Each test sample was connected to the LCR meter in the same manner as described hereinbefore, and sandwiched between tensile strength-compression strength measuring members 17 and 18 of an all-purpose tensile-compression tester, TCM-1000, made by Shinko Tsusin Kogyo K.K. Then, measurement was conducted at a compression-drawing cycle mode of 1 mm per minute up to 240 kg using a load cell of 500 kg in a full scale to obtain the graphs shown in FIGS. 15 to 18.

Additionally, FIG. 15 is a graph showing the results of the measurement of the test sample for Example 4, FIG. 16 is a graph showing the results of the measurement for Comparative Example 3, FIG. 17 is a graph showing the results of the measurement for Comparative Example 4, and FIG. 18 is a graph showing the results of the measurement for Comparative Example 5.

It has been found from FIGS. 15 to 18 that the test sample for Example 4 showed the least hysteresis, and the test sample for Comparative Example 5 showed the largest hysteresis and that this was in a close relation to the physical properties of the vulcanized moldings shown in the lower part of Table 2. These test results reveal that it was only the test sample of Example 4 that showed a hysteresis of 1 PF.

TABLE 2

|  | Ex. 4 | Comp. Ex. 3 | Comp. Ex. 4 | Comp. Ex. 5 |
| --- | --- | --- | --- | --- |
| Catalogue described matter |  |  |  |  |
| Grade | #KE9511U* | #XE951-U* | #XE152-U* | #KE650-U* |
| Main Use | Industrial material with high resistance against flexing fatigue | Food packing; Rubber stopper for medical use; Industrial packing | Transparent tubes for beverage; For other foods | Boots; For sealing use such as O-rings |
| Hardness | 50 deg. | 50 deg. | 50 deg. | 50 deg. |
| *1 | 4.6% | 10.0% | 18.0% | 36.0% |
| Actual measurements |  |  |  |  |
| Hardness | 50 deg. | 49 deg. | 50 deg. | 51 deg. |
| tanδ | 0.016 | 0.038 | 0.046 | 0.065 |

TABLE 2-continued

|  | Ex. 4 | Comp. Ex. 3 | Comp. Ex. 4 | Comp. Ex. 5 |
| --- | --- | --- | --- | --- |
| Impact resilience | 83% | 68% | 57% | 41% |
| *2 | 2.5% | 6.2% | 12.3% | 18.7% |

*manufactured by Shin-etu Kagaku K.K.
*1: compression set measured at 150° C. for 22 hours
*2: compression set measured at 25° C. for 22 hours

EXAMPLE 5 AND COMPARATIVE EXAMPLES 6 AND 7

Similar tests were conducted using 50 degree polyurethane rubbers of caprolactone series described in Table 3. As polyol, a bi-functional product of a trade name of PCL22ON (made by Daisel Ltd.), having a molecular weight of 2000 and both terminal hydroxyl groups, was used. After dehydrating this polyol at 120° C., it was mixed with an MDI isocyanate produce of a trade name of Milionate MT (made by Nippon Polyurethane K.K.) and a cross-linking agent, TMP, and the resulting mixture was poured into a mold for producing a pipe-shaped product, then heated at 100° C. for 12 hours in an electric furnace to harden. Thus, test materials were prepared.

The materials were finish-abraded into a thickness of 1.5 mm using an abrasion machine for rubber, and cut into sheets. Strip pieces of the same dimensions as in Example 3 were prepared and disposed at regular intervals to prepare test samples of Example 5 and Comparative Examples 6 and 7 shown in FIG. 3(b). These test samples were subjected to the tests in the same manner as in Example 1 to obtain the graphs shown in FIGS. 19 to 21.

Additionally, FIG. 19 is a graph showing the results of Example 5, and FIGS. 20 and 21 are graphs showing the results of Comparative Examples 6 and 7, respectively.

By comparing the results with respect to the physical properties in Table 3, it was found that the test sample of Example 5 having good tan δ, impact resilience and compression set was usable as a pressure sensor. Thus, it was confirmed that materials having physical properties in accordance with the present invention were also obtained by using polyurethane rubber.

Additionally, in each of the above Examples, descriptions are made by reference to the case where three electrode layers are provided. It is also possible to provide 5 or more odd-numbered electrode layers parallel to each other, between each two of which may be provided a dielectric layer, or two electrode layers may be provided parallel to each other between which a dielectric layer is disposed.

TABLE 3

|  |  | Example 5 | Comp. Ex. 6 | Comp. Ex. 7 |
| --- | --- | --- | --- | --- |
| Formulation | PCL 220N - | 100.0 |  |  |
|  | Milionate MT | 21 | 23 | 25 |
|  | TMP | 2.6 | 3.0 | 3.5 |
| Actual Measurement | Hardness | 60 deg. | 59 deg | 60 deg. |
|  | Impact resilience | 80% | 56% | 42% |
|  | Tan δ | 0.015 | 0.039 | 0.064 |
|  | Compression set | 2.1% | 8.5% | 36.2% |

Another embodiment of the present invention is specifically described below.

In an embodiment shown in FIG. 22, first dielectric pieces 9' and second dielectric pieces 10' are provided between a first electrode layer 53 and a second electrode layer 54. The first dielectric pieces 9' and the second dielectric pieces 10' are disposed so that their longitudinal direction crosses at right angles to the paper plane and have a parallelogram-shaped cross-section when taken along the direction crossing at right angles to the longitudinal direction.

Each of the first dielectric pieces 9' is inclined rightwardly at an angle of $\alpha°$ with respect to the second electrode layer 54, whereas each of the second dielectric pieces 10' is inclined leftwardly at an angle of $\alpha°$ with respect to the second electrode layer 54. The first dielectric pieces 9' are alternately provided, with the number of the first dielectric pieces 9' being the same as the number of the second dielectric pieces 10'. Additionally, although the number of the first dielectric pieces 9' is the same as the number of the second dielectric pieces in FIG. 22, the numbers may be slightly different from each other.

When pressure is applied to the first electrode layer 53, forces to shift the first electrode layer 53 and the second electrode layer 54 in directions different from the pressure-applying direction (vertical direction in FIG. 22) are cancelled out because of the above-described structure, and the shearing deformation can effectively be utilized. That is, the above-described structure serves to prevent the first electrode layer 53 and the second electrode layer 54 from shifting in a horizontal direction. Thus, a pressure sensor showing a wide region where capacitance changes in a linear manner is provided.

In addition, a ratio of width (W1) of each of the first dielectric pieces 9' (or second dielectric pieces 10') in contact with the first electrode layer 53 (or second electrode layer 54) to thickness (T1) of the first dielectric layer 9 (or second dielectric layer 10), i.e., W1/T1, is preferably 2/3. As to the thickness of the first dielectric pieces 9' and the second dielectric pieces 10', it is preferably 0.2 mm to 5 mm, and most preferably 1.5 mm, in view of the ease of their production and the minimization of the scattering in sensitivity of the thus produced pressure sensors.

Additionally, in practicing this embodiment of the present invention, as is shown in FIG. 23, a variable number N (N=5 in FIG. 23) of first dielectric pieces' are inclined at an angle of $\alpha°$ rightwardly with respect to the second electrode layer 54 which may be provided on one side, while a variable number N (N=5 in FIG. 23) of second dielectric pieces 10' are inclined at an angle of $\alpha°$ leftwardly with respect to the second electrode layer 54 which may be provided on the other side.

Figure 24A:
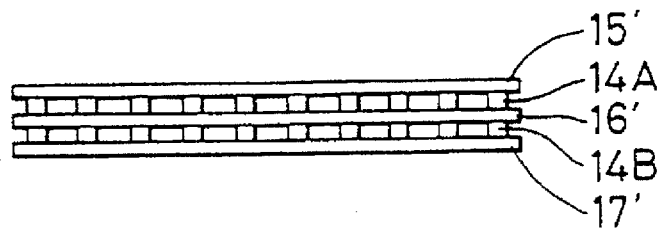
FIG. 24(A) is a side view of a pressure sensor.

Further, in order to obtain a practical pressure sensor, a structure, wherein two dielectric layers of dielectric layer 14(A) and dielectric layer 14(B) and three electrode layers 15', 16' and 17' sandwiching them are disposed as shown in FIG. 24(A), is preferred since it is scarcely affected by ambient atmospheric charge upon use, which serves to reduce error of capacitance upon measurement.

Figure 24B:
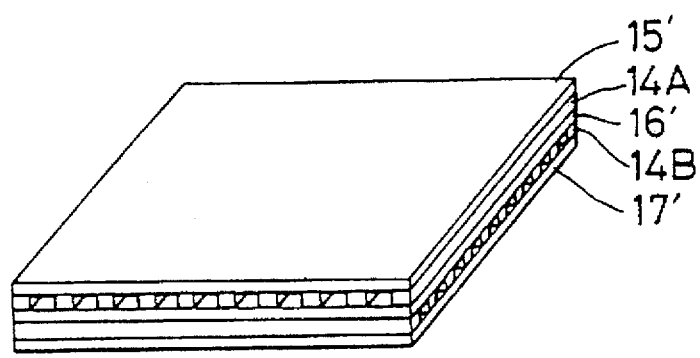
FIG. 24(B) is a perspective view of a pressure sensor, wherein the upper dielectric pieces are disposed at right angles to the lower dielectric pieces.

Further, in uses where pressure is applied to the pressure sensor in a non-specific direction, a structure, as shown in FIG. 24(B), wherein the upper dielectric layer 14(A) and the lower dielectric layer 14(B) are so disposed that dielectric pieces constituting respective dielectric layers cross at right angles to each other, is desirable.

Additionally, in the case of using a rubber elastic body with a certain formulation where a load to be measured is so large that the dielectric layer pieces with a parallelogram-shaped cross-section is deformed out of the region with a good linearity or where the parallelogram-shaped cross-sectional dielectric layer pieces might possibly be broken due to too large of a deformation of the dielectric layer pieces, it may also be possible to increase electrode layers 38 and dielectric layer 39 in number to form a multi-layered structure as shown in FIGS. 25(A) to (E). This serves to reduce the pressure per dielectric layer and prevent the pressure sensor from being damaged upon a maximum load being applied thereto. In such a case, it suffices to dispose odd-numbered electrode layers 38 parallel to each other with each of the dielectric layers 39 being sandwiched between each two of them, with odd-numbered electrode layers 38 (excluding the dielectric layers) being connected to each other with a wiring cord in a parallel connection and connected to one terminal of an alternative power source, and even-numbered electrode layers 38 (excluding dielectric layers) being connected to each other with a wiring cord in a parallel connection and connected to the other terminal of the alternating power source.

In order to prevent unnecessary shift at a pressure-applied area due to searing deformation, the sectional shape may not be a parallelogram, and dielectric pieces with various cross-sectional shapes 41, 42, 43, 44, 45 and 46 as shown in FIGS. 26(A) to (D) may also be used. With respective dielectric pieces 41 to 46 being used almost in the same number. That is, as is shown in FIG. 26(A), the cross-sectional shape of the dielectric shown in FIG. 26(A), the cross-sectional shape of the dielectric pieces may be such that $\alpha=45°$ and $\beta=90°$. Thus, the dielectric pieces may have any cross-sectional shape as long as $\alpha$ is in the range of from 30° to 85° and $\beta$ is in the range of from 90° to 145°, and those cross-sectional shapes designated by numeral 43 to 46 in FIGS. 26(B) and (C) may be employed.

Figure 26B:
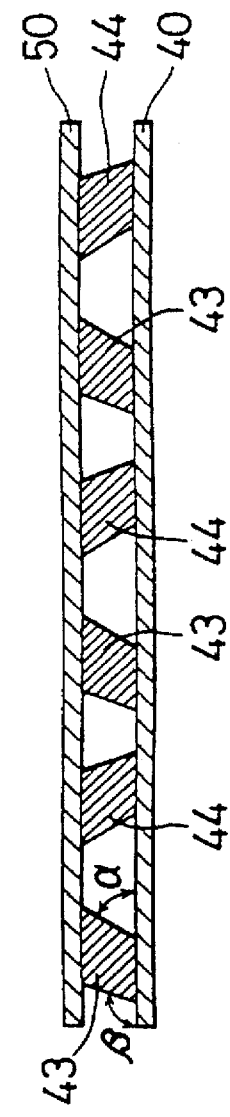
Figure 26C:
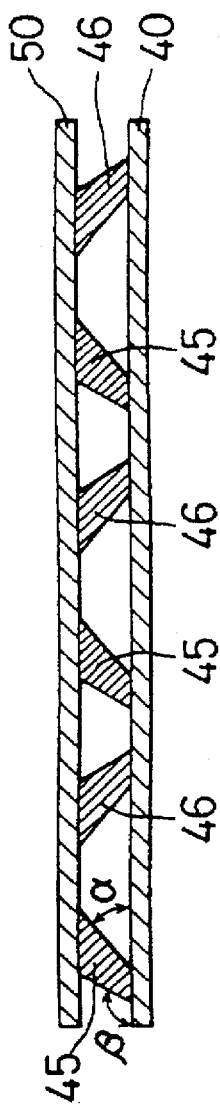
Figure 26D:
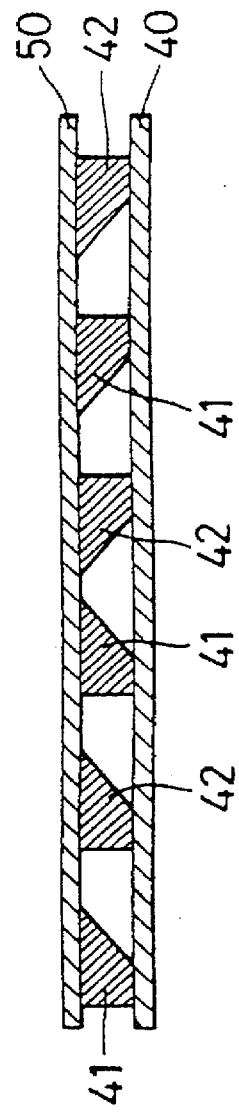

In addition, although, in FIGS. 26(A) to (C), the dielectric pieces of different sections are alternatively provided (i.e., in the order of a dielectric piece 41 and a dielectric piece 42, or of a dielectric piece 43 and a dielectric piece 44 in a horizontally symmetrical manner with respect to the cross-sectional shape, it is also possible to provide a variable number N (N=3 in FIG. 26) of dielectric pieces 51 directed in the same direction on one side, and a variable number N (N=3 in FIG. 26) dielectric pieces 42 on the other side so that the cross-sectional shapes thereof are symmetrical with each other.

Additionally, in FIGS. 26(A) to (D), numeral 0 designates a first electrode layer, and 40 a second electrode layer.

The manner of disposing the dielectric layers is not limited to those described above, and those shown, for example, in FIGS. 32 and 33, may also be employed. That is, dielectric pieces 47 and 48 may be provided at a predetermined angle of γ to side 35(A) of the second electrode layer 35, with the dielectric pieces 47 and 48 being disposed in a symmetrical manner with respect to the cross-sectional shape.

Further, as is shown in FIGS. 34 and 35, a pair of dielectric pieces 47 and 48 may be disposed so that the upper ends of the pieces in FIG. 34 are further spaced apart than the lower ends, with this relationship being alternately reversed as shown in FIG. 34.

Figure 36:
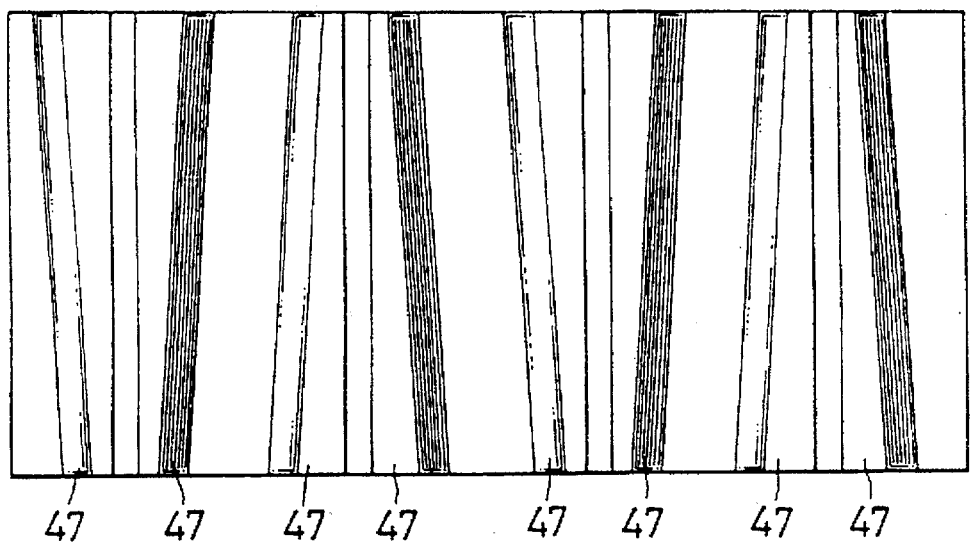
FIG. 36 is a plan view of a pressure sensor before a first electrode is applied thereto.
Figure 37:
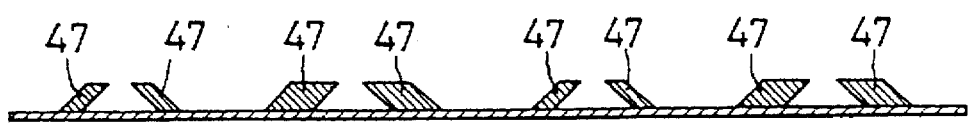
FIG. 37 is a view of the pressure sensor of FIG. 36 viewed from one longitudinal direction of the dielectric layer.
Figure 38:
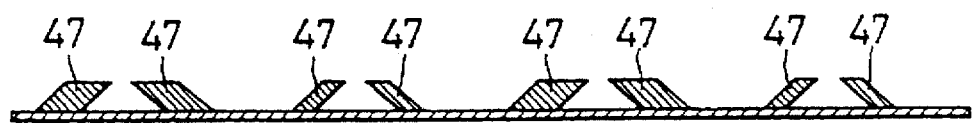
FIG. 38 is a view of the pressure sensor of FIG. 36 viewed from the other longitudinal direction of the dielectric layer.
Figure 39:
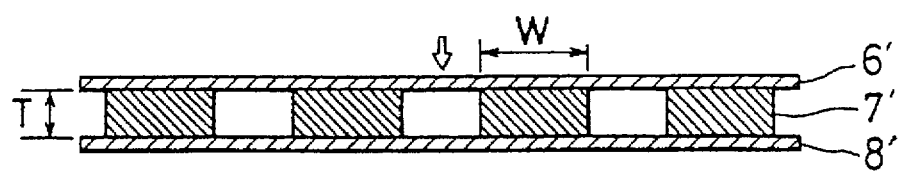
FIG. 39 is a cross-sectional view of a conventional pressure sensor.
Figure 40:
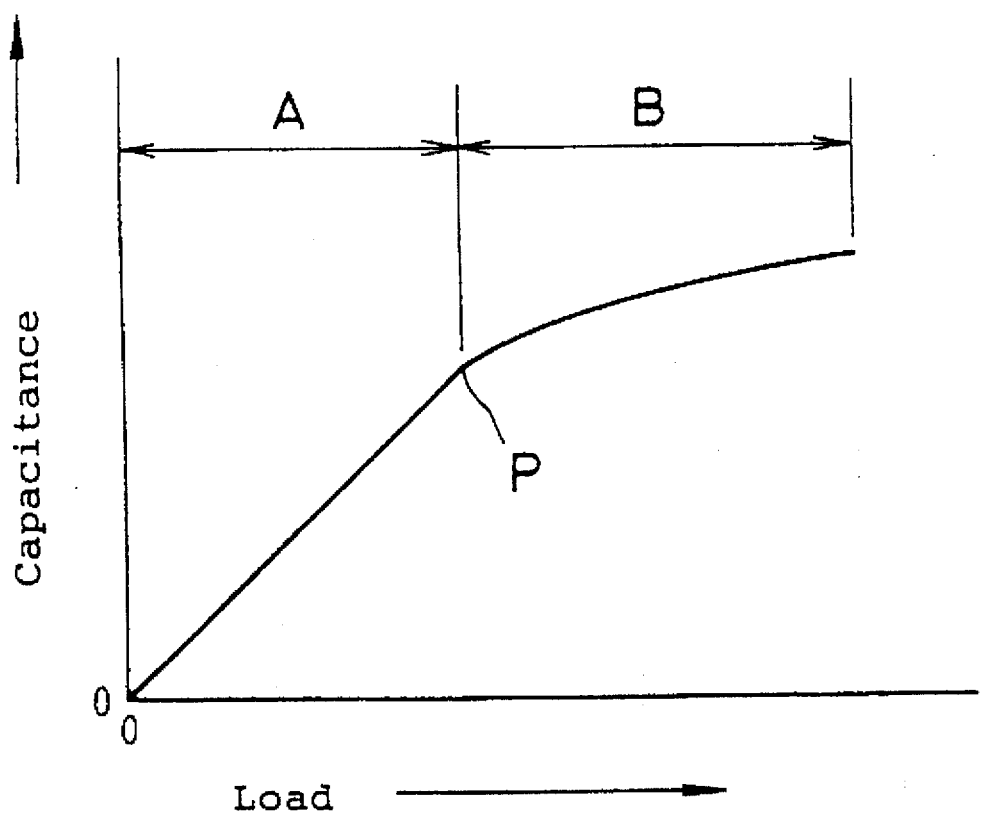
FIG. 40 is a graph showing the relationship between load and change in capacitance with respect to a conventional pressure sensor.

Still further, as is shown in FIGS. 36 to 38, a pair of dielectric pieces 47 which have a continuously decreasing width in the downward direction in FIG. 36, i.e., the dimension in the horizontal direction in FIG. 36 may be provided, with this relationship being alternately put in a space reversed as shown in FIG. 36.

As to the materials for the dielectric pieces to be used, it is important for them to have a high impact resilience and a small compression set, and those materials having a high impact resilience and a small compression set such as natural rubber, IR, BR, polyurethane rubber, silicone rubber, etc. may be employed.

A lower rubber hardness provides a higher spring constant, whereas a higher rubber hardness provides a higher spring constant. Thus, for example, dielectric pieces for manufacturing various general-purpose pressure sensors whose maximum measurable loads are from about 10 kg to 1000 kg may use rubbers with a rubber hardness of 20 degrees to 80 degrees in terms of scale A described in JIS-K-6301 taking the spring constant, shape, area, and other factors into consideration.

Assuming the case of manufacturing a pressure sensor whose maximum measurable load is about 100 kg and which is designed for measuring pressure force of rubber rolls in a printing press, a rubber with a rubber hardness of 30 degrees to 40 degrees in terms of scale A described in JIS-K-6301 is preferably used for the dielectric pieces and, as a material for the dielectric layer, a silicone rubber is one of the optimal materials due to its good rubber elasticity, its small amount of change in spring constant with time, and its small amount of change in spring constant upon temperature being changed.

EXAMPLES 6 AND 7, AND COMPARATIVE EXAMPLES 8 TO 10

In order to confirm the relationship between cross-sectional shape and output, the following tests were conducted using the same rubber material, the same rubber hardness, and the same area to which pressure was applied.

As rubber for the dielectric layer, polybutadiene rubber having the formulation shown in FIG. 4 was used. This was subjected to electrical heat press molding under the conditions of 165° C.×15 minutes and 200 kg/cm* to prepare a vulcanized rubber sheet of 1.5 mm in thickness, 150 mm in width, and 200 mm in length. This sheet has a rubber hardness of 40 degrees in terms of scale A described in JIS-K-6301.

Figure 24C:
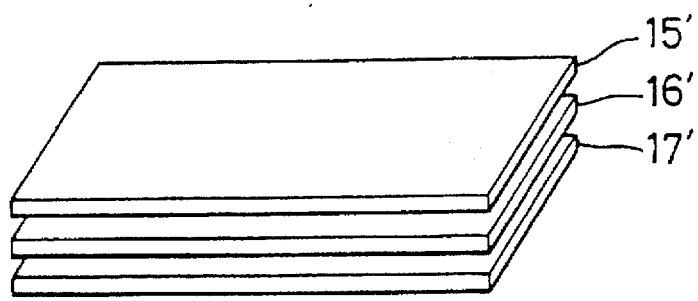
FIG. 24(C) is a perspective view of electrode layers.
Figure 24D:
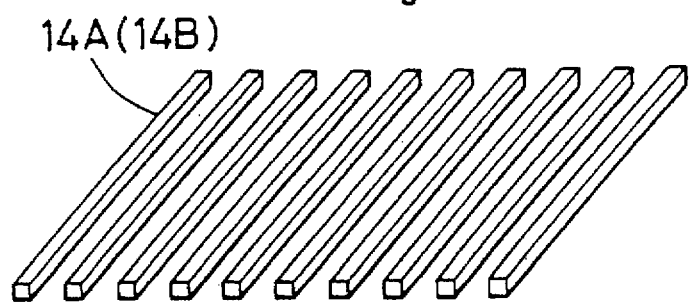
FIG. 24(D) is a perspective view of dielectric pieces.
Figure 25A:
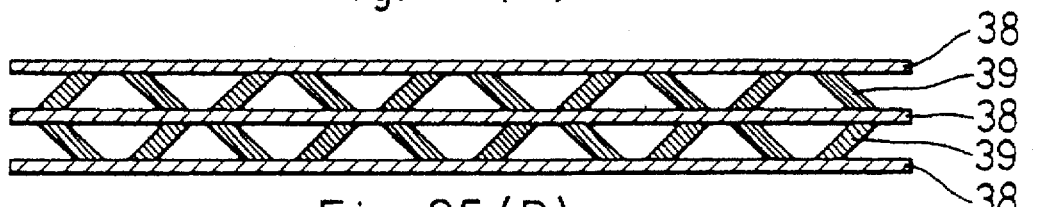
FIG. 25(A) to (E) are cross-sectional views of pressure sensors.
Figure 25B:
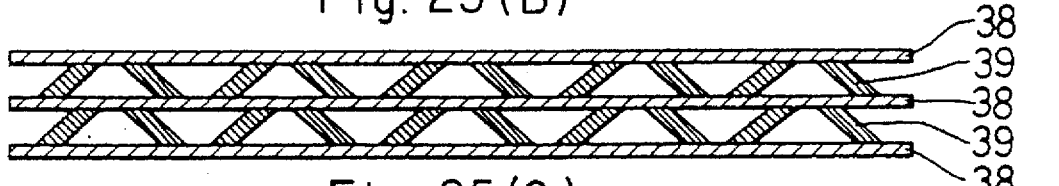
Figure 25C:
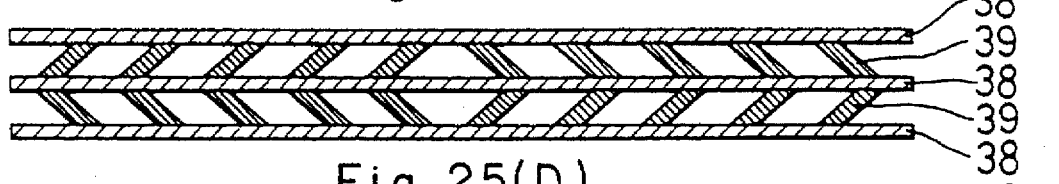
Figure 25D:
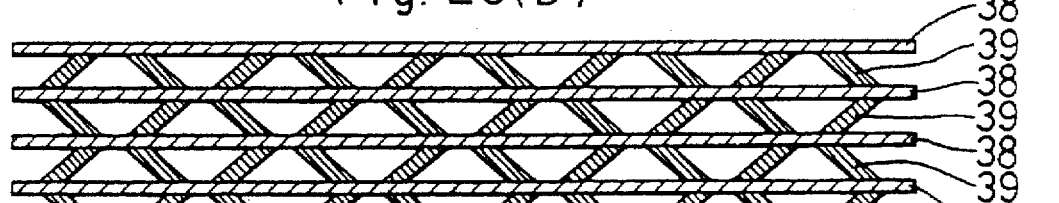
Figure 25E:
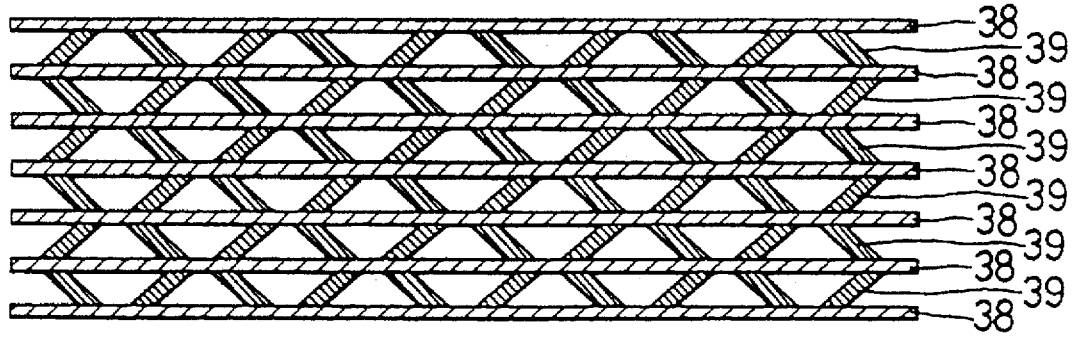

Then, this rubber sheet was cut into 5 kinds of strip pieces (dielectric pieces) respectively having cross-sectional shapes shown in Table 5, letter A to letter E (cross-sectional shapes taken along the plane crossing at right angles to the longitudinal direction) without changing thickness and length. The strip pieces letter A to letter E were respectively adhered to the first electrode layer 15', second electrode layer 17', and third electrode layer 17' shown in FIG. 24(C) to be parallel to each other. Additionally, each electrode was made of an aluminum plate of 200 mm in width, 250 mm in length, and 5 mm in thickness. This adhesion was conducted as shown in FIG. 24(A) so that an area to which pressure is to be applied of the dielectric layers 14(A) and 14(B) (sum of the contact area between one side of the dielectric piece constituting the dielectric pieces 14(A) (or 14B) and the electrode layer) was equally 60 cm* with letter A through letter E (see Table 6) using the aforesaid strip pieces (dielectric pieces) in the number described in Table 6 and an urethane series two-part adhesive.

Thus, there were prepared 5-layered test samples having two dielectric layers and three electrode layers as shown in FIGS. 27(A) to (E), i.e., test sample No. T-1 (Comparative Example 8), No. T-2 (Comparative Example 9), No. T-3 (Comparative Example 10), No. T-4 (Example 6), and No. T-5 (Example 7).

Additionally, numerals 27' and 29' in FIGS. 27 (A) to (E) represent a first dielectric layer and a second dielectric layer, respectively. Signs 27A and 27B in FIG. 27(D) represent a first dielectric piece and a second dielectric piece in the first dielectric layer 27', respectively, and signs 29A and 29B represent a first dielectric piece and a second dielectric piece in the first dielectric layer 29', respectively. Signs 27C and 27D in FIG. 27(E) represent a first dielectric piece and a second dielectric piece in the first dielectric layer 27', respectively, and signs 29C and 29D represent a first dielectric piece and a second dielectric piece in the first dielectric layer 27', respectively. Additionally, FIG. 24 (A) shows an example prepared by using the strip pieces 14A (14B) shown in FIG. 24 (D) (No. T-3).

Then, each of the test samples No. T-1 to T-5 was connected to a precision LCR meter, HP4284, made by Hewlett Packard Company in such a manner that, as is shown in FIG. 28, the first electrode layer 15' and the third electrode layer 17' were connected to one output terminal 22' of the precision LCR meter via a connecting portion 20' using wire cords 18' and 19', respectively, and the remaining second electrode layer 16' was connected to the other output terminal 23' of the LCR meter through a wire cord 21'. An alternating current voltage of 1 MHZ 6 V was applied thereacross, and a 20-kg weight or weights 25' were placed in piles on each of the samples (first electrode layer 15') (see FIG. 28) to apply loads of 0 kg, 20 kg, 40 kg, 60 kg, and 100 kg. Capacitance of each test sample under each load was measured. The results thus obtained are shown in Table 7 and FIG. 29.

As is apparent from Table 7 and FIG. 29, changing amounts of capacitance with the test sample of Example 6 (cross-sectional shape: diamond shaped) and the test sample of Example 7 (cross-sectional shape: parallelogram shaped) are clearly different from those with the test samples of Comparative Examples 8 to 10 having the same contact area with the electrode layer and undergoing simple compression. Thus, the test samples of Examples 6 and 7 are proved to have a sensitivity several times greater than the test samples of Comparative Examples 8 to 10. In the case of simple compression, the test sample of Comparative Example 9 (W/T=2.0) is said to be within a limit of not suffering abnormal deformation or falling down upon being pressed. Thus, the test sample of Comparative Example 10 is not used in simple compression. To compare to the test sample of Comparative Example 9, which is most popular for simple compression, the test sample of Example 8 (W/T=1) was found to show a 4-fold changing amount, and the test sample of Example (W/T=2/3) a more than 5-fold changing amount.

TABLE 4

| Compound Chemicals | Parts by Weight |
| --- | --- |
| JSR-BR-01 | 100.0 |
| Active zinc flower | 5.0 |
| stearic acid | 0.5 |
| Aging inhibitor 3C | 0.5 |
| Percumyl D-40 | 6.0 |
| Diana PX-50 | 8.0 |
| Nipsil VN3 | 2 |
| Precipitated sulfur | 1.0 |

TABLE 5

| Letter | Sectional Shape of Dielectric Pieces |
| --- | --- |
| A | Rectangle; 1.5 mm thick; 6 mm wide |
| B | Rectangle; 1.5 mm thick; 3 mm wide |
| C | Rectangle; 1.5 mm thick; 1.5 mm wide |

TABLE 5-continued

| Letter | Sectional Shape of Dielectric Pieces |
| --- | --- |
| D | 45 deg. Diamond<br>1.5 mm thick;<br>1.5 mm wide |
| E | 45 deg. Parallelogram;<br>1.5 mm thick;<br>1.0 mm wide |

TABLE 6

|  | Shape of Rubber used in Each Test Sample (Dielectric Layer described in Table 5) | Number of Rubber per layer of Sample | Pressure applied Area |
| --- | --- | --- | --- |
| Comp. Ex. 8 (No.T-1) | No. A (rectangle) | 5 | 60 cm$^2$ |
| Comp. Ex. 9 (No.T-2) | No. B (rectangle) | 10 | 60 cm$^2$ |
| Comp. Ex. 10 (No.T-3) | No. C (square) | 20 | 60 cm$^2$ |
| Example 6 (No.T-4) | No. D (diamond) | 30 | 60 cm$^2$ |
| Example 7 (No.T-4) | No. B (parallelogram) | 30 | 60 cm$^2$ |

TABLE 7

Test Results for Examples 6 and 7, and Comparative Examples 8 to 10 (change in capacitance (Cp) for respective loads; and rate of change taking change in Comparative Example 8 as 1; provided that numerals are presented in terms of pico-farad (Cp))

| Load | 0 kg ΔCp | 20 kg ΔCp* | 40 kg ΔCp* | 60 kg ΔCp* | 80 kg ΔCp* | 100 kg ΔCp* |
| --- | --- | --- | --- | --- | --- | --- |
| Comp. Ex. 8 (No. T-1) | 0.0 | 4.8 1.0 | 9.2 1.0 | 13.3 1.0 | 16.8 1.0 | 18.5 1.0 |
| Comp. Ex. 9 (No. T-2) | 0.0 | 12.0 2.5 | 22.4 2.4 | 31.6 2.4 | 39.0 2.3 | 43.6 2.4 |
| Comp. Ex. 10 (No. T-3) | 0.0 | 15.8 3.3 | 30.1 3.3 | 43.2 3.2 | 54.1 3.2 | 61.4 3.3 |
| Example 6 (No. T-4) | 0.0 | 32.0 6.7 | 63.1 6.9 | 95.6 7.2 | 129.6 7.7 | 159.6 8.6 |
| Example 7 (No. T-4) | 0.0 | 38.3 8.0 | 75.7 8.2 | 114.7 8.6 | 154.5 9.2 | 191.0 10.3 |

*rate of change

EXAMPLES 8 to 10, AND COMPARATIVE EXAMPLES 11 AND 12

As a test for making practicable by increasing the rate of change in capacitance, tests were conducted using silicone rubbers having a good heat resistance and a good cold resistance and less dependance on temperature to examine how rubber hardness, pressure-applying area, and cross-sectional shape exert influences on capacitance in comparison with standard simple compression shape. Table 8 describes cross-sectional shape of dielectric pieces constituting the dielectric layers of respective Examples and Comparative Examples, cross-sectional shapes of tested samples, and contact areas between the dielectric pieces and the electrode layer.

The silicone rubber which was used is a dimethylsilicone rubber of existing grade, i.e., #KE931U (30 deg.), made by Shin-etu Kagaku K.K., were compounded in a manner specified by the manufacturer, and kneaded in an oven roll to prepare a raw rubber material. Three test samples, for No. T-8 (Example 8), No. T-9 (Example 9), and No. T-10 (Example 10), which were expected to show large change in capacitance from the results shown in Table 8, were prepared as follows.

Figure 30A:
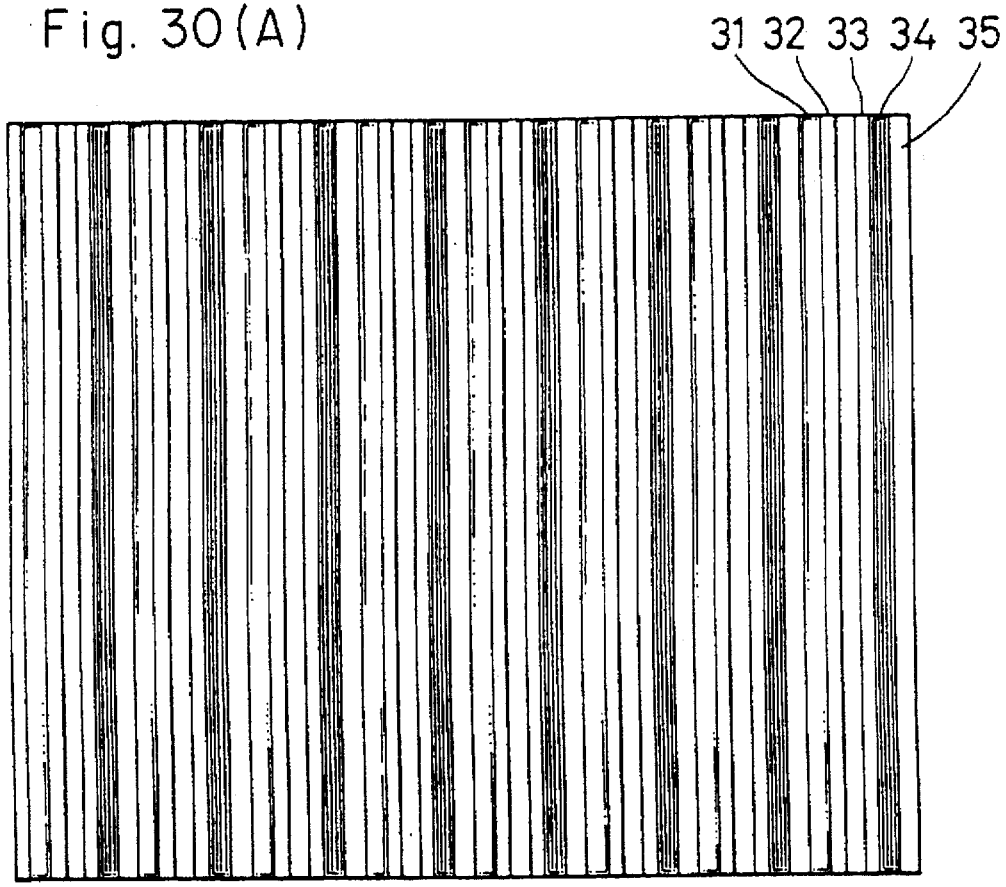
FIG. 30(A) is a plan view of a pressure sensor before a first electrode is applied thereto.
Figure 30B:
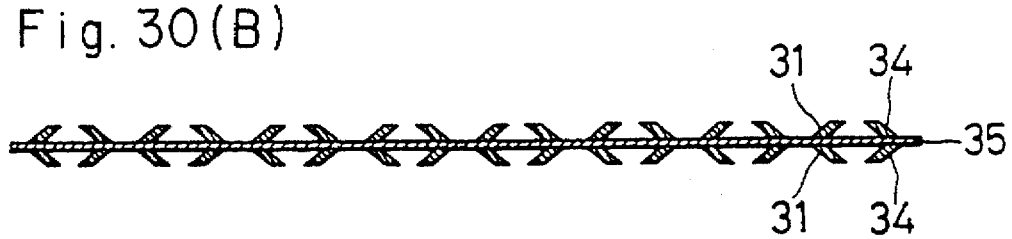
FIG. 30(B) is a side view of (A).

That is, as is shown in FIGS. 30(A) and (B), dielectric pieces 31 and 34 of Examples 8 to 10 were disposed on and beneath a second electrode layer (35) composed of a 0.2-mm thick stainless steel sheet, SUS#301, in a symmetrical manner with respect to the cross-sectional shape, and adhered via an adhesive using a newly made special press molding under the molding conditions of 170° C., 10 minutes, and 200 kg/cm$^2$ to prepare intermediate products. FIG. 30(A) is a plan view of the intermediate products, and FIG. 30(B) a side view thereof.

Figure 30C:
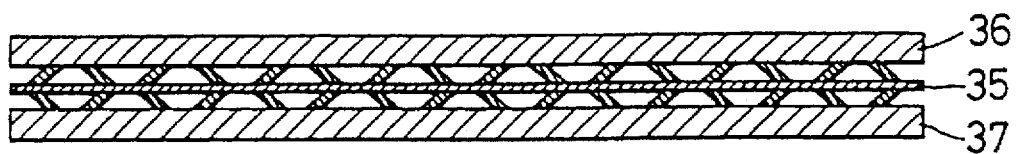
FIG. 30(C) is a cross-sectional view of a pressure sensor after the first electrode layer is applied thereto.

Each of the intermediate products was adhesively sandwiched so that a 1-mm thick, aluminum-made first electrode layer 36 was on the upper side, and a 1-mm thick, aluminum-made second electrode layer 37 on the lower side through an RTV silicone rubber of 30 degrees in rubber hardness to prepare test samples shown in FIG. 30(C). FIG. C is a cross-sectional view of the test sample.

Two test samples of Comparative examples 11 and 12 for comparison having a simple compression shape were prepared as follows. A 1.5 mm thick press-molded sheet composed of silicone rubber was prepared in the same manner as in Example 6, and was cut into strip pieces having a rectangular section as with test sample Nos. T-6 and No. T-7 in Table 8.

Then, the strip pieces were adhered in the same manner as in Example 6 to prepare test samples. Additionally, as an adhesive, the same RTV silicone rubber of 30 degrees in rubber hardness as used for Nos. T-8 to T-10 was used. Five kinds of the test samples for Nos. T-6 to T-10 were additionally heated in an electric furnace at 200° C. for 4 hours to stabilize their physical properties.

Each of the above-described test samples was tested in the same manner as in Example 1. Results thus obtained are shown in Table 9 and FIG. 31.

It is seen from the results, that the test sample of Example 10 having a pressure-applied area of 40 cm$^2$ in Example 6, etc. and having a rubber hardness of 30 degrees shows change in capacitance of about 5 times as much as that of the test sample of average simple compression and of 40 degrees in rubber hardness (test sample of Comparative Example 11). Thus, much greater change in capacitance was confirmed in comparison with the conventional one.

Additionally, when a pressure sensor for measuring pressure of pressure rolls in a printing press was made using the test sample of Example 10, it showed a change of 245 PF under a load of 100 kg with enough linearity. Thus, it becomes possible to make a pressure sensor capable of measuring up to 100 kg which is composed of a dielectric layer (made of rubber) of at least 1 PF=0.5 kg and electrode plates. Furthermore, the pressure sensor thus made is difficult to break and can be made inexpensively.

TABLE 8

|  | Dielectric Piece | | Sectional Shape of Test Sample Odd-number Order... | |
| --- | --- | --- | --- | --- |
|  | Rubber Hardness | Dimension and Shape of Section | Electrode Layer Even-number Order... Dielectric Layer | Pressure applying Area |
| Comp Ex.11 | 40 Deg. | 1.5 mm thick; | Rectangle; | 60 cm$^2$ |

TABLE 8-continued

| Dielectric Piece | | Sectional Shape of Test Sample Odd-number Order... | |
|---|---|---|---|
| Rubber Hardness | Dimension and Shape of Section | Electrode Layer Even-number Order... Dielectric Layer | Pressure applying Area |
| (No. T-6) Comp | 30 Deg. | 3.0 mm wide Rectangle; | 60 cm2 |
| Ex.12 (No. T-7) Ex. 8 | 30 Deg. | 1.5 mm thick; 3.0 mm wide Parallelogram; | 60 cm² |
| (No. T-8) Ex. 9 | 30 Deg. | 1.5 mm thick; 1.0 mm wide (angle of Inclination α = 45°) Parallelogram; | 50 cm² |
| (No. T-9) Ex. 9 | 30 Deg. | 1.5 mm thick; 1.0 mm wide (angle of Inclination α = 45°) Parallelogram; | 40 cm² |
| (No. T-9) | | 1.5 mm thick; 1.0 mm wide (angle of Inclination α = 45°) | |

TABLE 9

Test Results for Examples 8 and 9, and Comparative Examples 1 1 and 12 (change in capaCitance (Cp) for respective loads; and rate of change taking change in Comparative Example 8 as 1; provided that numerals are presented in terms of pico-farad (Cp))

| Load | 0 kg ΔCp | 20 kg ΔCp* | 40 kg ΔCp* | 60 kg ΔCp* | 80 kg ΔCp* | 100 kg ΔCp* |
|---|---|---|---|---|---|---|
| Comp. Ex. 8 (No. T-1) | 0.0 | 12.8 1.0 | 24.0 1.0 | 33.8 1.0 | 40.9 1.0 | 46.1 1.0 |
| Comp. Ex. 9 (No. T-2) | 0.0 | 15.1 1.2 | 28.4 1.2 | 39.9 1.2 | 49.2 1.2 | 56.4 1.2 |
| Comp. Ex. 10 (No. T-3) | 0.0 | 39.2 3.1 | 75.8 3.1 | 117.4 3.5 | 152.8 3.7 | 187.0 4.1 |
| Example 6 (No. T-4) | 0.0 | 45.6 3.6 | 91.2 3.8 | 113.8 3.9 | 174.6 4.3 | 217.6 4.7 |
| Example 7 (No. T-4) | 0.0 | 55.2 4.3 | 103.6 4.3 | 152.8 4.5 | 202.3 4.9 | 245.0 5.3 |

*Rate of Change

An advantage of the present invention is that a pressure sensor is provided which is capable of measuring either weight or pressure with high accuracy, without being of a complicated structure.

What is claimed is:

1. A pressure sensor, comprising:

a pair of electrode layers; and a dielectric layer composed of a rubber elastic body positioned between said pair of electrode layers to act as a spacer for said pair of electrode layers, said dielectric layer showing a tan δ at 1 to 30 Hz at a temperature of 10° C. to 30° C. of 0.03 or less and having a rubber hardness of 20 to 80 degrees in terms of scale A according to JIS-K-6301 at 10° C. to 30° C., an impact resilience of 75% or more measured according to JIS-K-6301 at 10° C. to 30° C. and a compression set of 3% or less measured according to JIS-K-6301 at 10° C. to 30° C.

2. The pressure sensor as described in claim 1, wherein said dielectric layer is formed by one of a group consisting of: natural rubber, polybutadiene rubber, polyisoprene rubber, polyurethane rubber and silicone rubber.

3. A pressure sensor, comprising:

a continuous first electrode layer;

a continuous second electrode layer positioned parallel to said first electrode layer;

at least one discontinuous dielectric layer made up of a plurality of rubber elastic pieces laid adjacent each other with a space therebetween to form a continuous length so as to space said first electrode layer from said second electrode layer, said discontinuous dielectric layer having an upper discontinuous surface thereof being in a close contact with said first electrode layer and a second opposing discontinuous surface thereof being in close contact with said second electrode layer, and wherein said discontinuous dielectric layer being formed so that said first discontinuous contact surface is shifted from said second opposing contact surface when viewed in a direction crossing at right angles to said first and second continuous electrode layers.

4. The pressure sensor as described in claim 3, wherein said at least one discontinuous dielectric layer has an almost parallelogramic section taken along a plane crossing at right angles to a longitudinal direction of said at least one discontinuous dielectric layer.

5. The pressure sensor as described in claim 4, wherein a plane crossing at right angles to said first and second continuous electrode layers crosses at an angle of 30 to 85 degrees to said at least one discontinuous dielectric layer.

6. The pressure sensor as described in claim 3, wherein a first side of a plane of said at least one discontinuous dielectric layer crosses at an angle of 30 to 85 degrees to said second electrode layer, and a second opposite side of said plane of said at least one discontinuous dielectric layer crosses at an angle of 90 to 145 degrees to said second electrode layer.

7. The pressure sensor as described in claim 3, wherein said at least one discontinuous dielectric layer comprises a first dielectric layer piece and a second dielectric layer piece disposed so that, when pressure is applied to said pressure sensor in a vertical direction with respect to said discontinuous contact surfaces of said first and second dielectric layer pieces, shifting forces of said first and second continuous electrode layers, respectively, are cancelled out.

8. The pressure sensor as described in claim 7, wherein a number of said first dielectric layer pieces is approximately similar to a number of said second dielectric layer pieces.

9. The pressure sensor as described in claim 3, wherein a quotient obtained by dividing a length of said discontinuous contact surface in said direction crossing at right angles to said longitudinal direction of said at least one discontinuous dielectric layer by a distance between said first and second continuous electrode layers ranges from approximately 0.2 to 0.5 mm.

10. The pressure sensor as described in claim 3, wherein said at least one discontinuous dielectric layer has a rubber hardness of 20 to 80 degrees measured in terms of scale A according to JIS-K-6301.

11. The pressure sensor as described in claim 3, wherein a distance between said first continuous electrode layer and said second continuous electrode layer is between 0.2 to 0.5 mm.

12. The pressure sensor as described in claim 3, wherein a third or more odd-numbered continuous electrode layers are provided, with an additional discontinuous dielectric layer being closely disposed between each pair of even and odd numbered continuous electrode layers.

13. The pressure sensor as described in claim 4, wherein a first side of said plane of said at least one discontinuous dielectric layer crosses at an angle of 30 to 85 degrees to said second electrode layer, and a second opposite side of said plane of said at least one discontinuous dielectric layer crosses at an angle of 90 to 145 degrees to said second electrode layer.

14. The pressure sensor as described in claim 4, wherein said at least one discontinuous dielectric layer comprises a first dielectric layer piece and a second dielectric layer piece disposed so that, when pressure is applied to said pressure sensor in a vertical direction with respect to said discontinuous surfaces of said first and second dielectric layer pieces, shifting forces of said first and second continuous electrode layers, respectively, are cancelled out.

15. The pressure sensor as described in claim 5, wherein said at least one discontinuous dielectric layer comprises a first dielectric layer piece and a second dielectric layer piece disposed so that, when pressure is applied to said pressure sensor in a vertical direction with respect to said discontinuous surfaces of said first and second dielectric layer pieces, shifting forces of said first and second continuous electrode layers, respectively, are cancelled out.

16. The pressure sensor as described in claim 6, wherein said at least one discontinuous dielectric layer comprises a first dielectric layer piece and a second dielectric layer piece disposed so that, when pressure is applied to said pressure sensor in a vertical direction with respect to said discontinuous surfaces of said first and second dielectric layer pieces, shifting forces of said first and second continuous electrode layers, respectively, are cancelled out.

17. The pressure sensor as described in claim 13, wherein said at least one discontinuous dielectric layer comprises a first dielectric layer piece and a second dielectric layer piece disposed so that, when pressure is applied to said pressure sensor in a vertical direction with respect to said discontinuous surfaces of said first and second dielectric layer pieces, shifting forces of said first and second continuous electrode layers, respectively, are cancelled out.

18. The pressure sensor as described in claim 14, wherein a number of said first dielectric layer pieces is approximately similar to a number of said second dielectric layer pieces.

19. The pressure sensor as described in claim 15, wherein a number of said first dielectric layer pieces is approximately similar to a number of said second dielectric layer pieces.

20. The pressure sensor as described in claim 16, wherein a number of said first dielectric layer pieces is approximately similar to a number of said second dielectric layer pieces.

21. The pressure sensor as described in claim 17, wherein a number of said first dielectric layer pieces is approximately similar to a number of said second dielectric layer pieces.

22. The pressure sensor as described in claim 4, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

23. The pressure sensor as described in claim 5, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

24. The pressure sensor as described in claim 6, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

25. The pressure sensor as described in claim 7, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

26. The pressure sensor as described in claim 8, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

27. The pressure sensor as described in claim 13, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

28. The pressure sensor as described in claim 14, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

29. The pressure sensor as described in claim 15, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

30. The pressure sensor as described in claim 16, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

31. The pressure sensor as described in claim 17, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

32. The pressure sensor as described in claim 18, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

33. The pressure sensor as described in claim 19, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

34. The pressure sensor as described in claim 20, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

35. The pressure sensor as described in claim 21, wherein a quotient obtained by dividing a length of said discontinuous contact surface in said direction crossing at right angles to said longitudinal direction of said at least one discontinuous dielectric layer by a distance between said first and second electrode layer ranges from approximately 0.2 to 0.5 mm.

36. The pressure sensor as described in claim 4, wherein said at least one discontinuous dielectric layer has a rubber hardness of 20 to 80 degrees measured in terms of scale A according to JIS-K-6301.

37. The pressure sensor as described in claim 5, wherein said at least one discontinuous dielectric layer has a rubber hardness of 20 to 80 degrees measured in terms of scale A according to JIS-K-6301.

38. The pressure sensor as described in claim 6, wherein said at least one discontinuous dielectric layer has a rubber hardness of 20 to 80 degrees measured in terms of scale A according to JIS-K-6301.

39. The pressure sensor as described in claim 7, wherein said at least one discontinuous dielectric layer has a rubber hardness of 20 to 80 degrees measured in terms of scale A according to JIS-K-6301.

40. The pressure sensor as described in claim 8, wherein said at least one discontinuous dielectric layer has a rubber hardness of 20 to 80 degrees measured in terms of scale A according to JIS-K-6301.

41. The pressure sensor as described in claim 9, wherein said at least one discontinuous dielectric layer has a rubber hardness of 20 to 80 degrees measured in terms of scale A according to JIS-K-6301.

42. The pressure sensor as described in claim 13, wherein said at least one discontinuous dielectric layer has a rubber hardness of 20 to 80 degrees measured in terms of scale A according to JIS-K-6301.

43. The pressure sensor as described in claim 14, wherein said at least one discontinuous dielectric layer has a rubber hardness of 20 to 80 degrees measured in terms of scale A according to JIS-K-6301.

44. The pressure sensor as described in claim 15, wherein said at least one discontinuous dielectric layer has a rubber hardness of 20 to 80 degrees measured in terms of scale A according to JIS-K-6301.

45. The pressure sensor as described in claim 16, wherein said at least one discontinuous dielectric layer has a rubber hardness of 20 to 80 degrees measured in terms of scale A according to JIS-K-6301.

46. The pressure sensor as described in claim 17, wherein said at least one discontinuous dielectric layer has a rubber hardness of 20 to 80 degrees measured in terms of scale A according to JIS-K-6301.

47. The pressure sensor as described in claim 18, wherein said at least one discontinuous dielectric layer has a rubber hardness of 20 to 80 degrees measured in terms of scale A according to JIS-K-6301.

48. The pressure sensor as described in claim 19, wherein said at least one discontinuous dielectric layer has a rubber hardness of 20 to 80 degrees measured in terms of scale A according to JIS-K-6301.

49. The pressure sensor as described in claim 20, wherein said at least one discontinuous dielectric layer has a rubber hardness of 20 to 80 degrees measured in terms of scale A according to JIS-K-6301.

50. The pressure sensor as described in claim 21, wherein said at least one discontinuous dielectric layer has a rubber hardness of 20 to 80 degrees measured in terms of scale A according to JIS-K-6301.

51. The pressure sensor as described in claim 4, wherein a distance between said first continuous electrode layer and said second continuous electrode layer is 0.2 to 0.5 mm.

52. The pressure sensor as described in claim 5, wherein a distance between said first continuous electrode layer and said second continuous electrode layer is 0.2 to 0.5 mm.

53. The pressure sensor as described in claim 6, wherein a distance between said first continuous electrode layer and said continuous second electrode layer is 0.2 to 0.5 mm.

54. The pressure sensor as described in claim 7, wherein a distance between said first continuous electrode layer and said second continuous electrode layer is 0.2 to 0.5 mm.

55. The pressure sensor as described in claim 8, wherein a distance between said first continuous electrode layer and said second continuous electrode layer is 0.2 to 0.5 mm.

56. The pressure sensor as described in claim 9, wherein said distance between said first continuous electrode layer and said second continuous electrode layer is 0.2 to 0.5 mm.

57. The pressure sensor as described in claim 10, wherein a distance between said first continuous electrode layer and said second continuous electrode layer is 0.2 to 0.5 mm.

58. The pressure sensor as described in claim 13, wherein a distance between said first continuous electrode layer and said continuous second electrode layer is 0.2 to 0.5 mm.

59. The pressure sensor as described in claim 14, wherein distance a between said first continuous electrode layer and said continuous second electrode layer is 0.2 to 0.5 mm.

60. The pressure sensor as described in claim 15, wherein a distance between said first continuous electrode layer and said second continuous electrode layer is 0.2 to 0.5 mm.

61. The pressure sensor as described in claim 16, wherein a distance between said first continuous electrode layer and said second continuous electrode layer is 0.2 to 0.5 mm.

62. The pressure sensor as described in claim 17, wherein a distance between said first continuous electrode layer and said second continuous electrode layer is 0.2 to 0.5 mm.

63. The pressure sensor as described in claim 18, wherein a distance between said first continuous electrode layer and said second continuous electrode layer is 0.2 to 0.5 mm.

64. The pressure sensor as described in claim 19, wherein a distance between said first continuous electrode layer and said second continuous electrode layer is 0.2 to 0.5 mm.

65. The pressure sensor as described in claim 20, wherein a distance between said first continuous electrode layer and said second continuous electrode layer is 0.2 to 0.5 mm.

66. The pressure sensor as described in claim 21, wherein a distance between said first continuous electrode layer and said second continuous electrode layer is 0.2 to 0.5 mm.

67. The pressure sensor as described in claim 4, wherein a third or more odd numbered electrode layers are provided, with an additional discontinuous dielectric layer being closely disposed between each pair of even and odd numbered continuous electrode layers.

68. The pressure sensor as described in claim 5, wherein a third or more odd numbered electrode layers are provided, with an additional discontinuous dielectric layer being closely disposed between each pair of even and odd numbered continuous electrode layers.

69. The pressure sensor as described in claim 6, wherein a third or more odd numbered electrode layers are provided, with an additional discontinuous dielectric layer being closely disposed between each pair of even and odd numbered continuous electrode layers.

70. The pressure sensor as described in claim 7, wherein a third or more odd numbered electrode layers are provided, with an additional discontinuous dielectric layer being closely disposed between each pair of even and odd numbered continuous electrode layers.

71. The pressure sensor as described in claim 8, wherein a third or more odd numbered electrode layers are provided, with an additional discontinuous dielectric layer being closely disposed between each pair of even and odd numbered continuous electrode layers.

72. The pressure sensor as described in claim 9, wherein a third or more odd numbered electrode layers are provided, with an additional discontinuous dielectric layer being closely disposed between each pair of even and odd numbered continuous electrode layers.

73. The pressure sensor as described in claim 10, wherein a third or more odd numbered electrode layers are provided, with an additional discontinuous dielectric layer being closely disposed between each pair of even and odd numbered continuous electrode layers.

74. The pressure sensor as described in claim 11, wherein a third or more odd numbered electrode layers are provided, with an additional discontinuous dielectric layer being closely disposed between each pair of even and odd numbered continuous electrode layers.

75. The pressure sensor as described in claim 13, wherein a third or more odd numbered electrode layers are provided, with an additional discontinuous dielectric layer being closely disposed between each pair of even and odd numbered continuous electrode layers.

76. The pressure sensor as described in claim 14, wherein a third or more odd numbered electrode layers are provided, with an additional discontinuous dielectric layer being closely disposed between each pair of even and odd numbered continuous electrode layers.

77. The pressure sensor as described in claim 15, wherein a third or more odd numbered electrode layers are provided, with an additional discontinuous dielectric layer being closely disposed between each pair of even and odd numbered continuous electrode layers.

78. The pressure sensor as described in claim 16, wherein a third or more odd numbered electrode layers are provided, with an additional discontinuous dielectric layer being closely disposed between each pair of even and odd numbered continuous electrode layers.

79. The pressure sensor as described in claim 17, wherein a third or more odd numbered electrode layers are provided, with an additional discontinuous dielectric layer being closely disposed between each pair of even and odd numbered continuous electrode layers.

80. The pressure sensor as described in claim 18, wherein a third or more odd numbered electrode layers are provided, with an additional discontinuous dielectric layer being closely disposed between each pair of even and odd numbered continuous electrode layers.

81. The pressure sensor as described in claim 19, wherein a third or more odd numbered electrode layers are provided, with an additional discontinuous dielectric layer being closely disposed between each pair of even and odd numbered continuous electrode layers.

82. The pressure sensor as described in claim 20, wherein a third or more odd numbered electrode layers are provided, with an additional discontinuous dielectric layer being closely disposed between each pair of even and odd numbered continuous electrode layers.

83. The pressure sensor as described in claim 21, wherein a third or more odd numbered electrode layers are provided, with an additional discontinuous dielectric layer being closely disposed between each pair of even and odd numbered continuous electrode layers.

* * * * *